(12) United States Patent  
Shinjo

(10) Patent No.: US 8,150,856 B2  
(45) Date of Patent: Apr. 3, 2012

(54) BIT STRING SEARCHING APPARATUS, SEARCHING METHOD, AND PROGRAM

(75) Inventor: Toshio Shinjo, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 346 days.

(21) Appl. No.: 12/385,956

(22) Filed: Apr. 24, 2009

(65) Prior Publication Data

US 2009/0210414 A1    Aug. 20, 2009

Related U.S. Application Data

(63) Continuation of application No. PCT/JP2007/001120, filed on Oct. 16, 2007, and a continuation-in-part of application No. 12/308,560, filed as application No. PCT/JP2007/000639 on Jun. 15, 2007, now Pat. No. 8,073,874.

(30) Foreign Application Priority Data

Jul. 7, 2006   (JP) ................................ 2006-187827  
Oct. 30, 2006  (JP) ................................ 2006-293619

(51) Int. Cl.  
    *G06F 7/00*     (2006.01)  
    *G06F 17/30*    (2006.01)
(52) U.S. Cl. ........................................ 707/745; 707/758
(58) Field of Classification Search .................. 707/745, 707/758  
See application file for complete search history.

(56) References Cited

U.S. PATENT DOCUMENTS

| 6,012,061 A | 1/2000 | Sharma |
| 6,675,163 B1 * | 1/2004 | Bass et al. ............................. 1/1 |

FOREIGN PATENT DOCUMENTS

| JP | H07-210569 A | 8/1995 |
| JP | 2001-357070 A | 12/2001 |
| JP | 2003-224581 A | 8/2003 |
| JP | 2008-015872 A | 1/2008 |
| JP | 2008-112240 A | 5/2008 |

OTHER PUBLICATIONS

Li, et al., "Stateful Inspection Firewall Session Table Processing", School of Computer Science and Technology, Harbin Institute of Technology, International Journal of Information Technology, vol. 11, No. 2, pp. 21-30 (2005).

(Continued)

*Primary Examiner* — Robert Stevens  
*Assistant Examiner* — Joshua Bullock

(57) ABSTRACT

Bit string searching apparatus using a coupled node tree with a root node and a node pair stored in adjacent areas that is formed by a branch node and a leaf node, branch nodes, or leaf nodes; the branch node including a discrimination bit position in the search key and information indicating a position of a primary node that is one node of a node pair; the leaf node including an index key formed by a bit string; from the root node of an arbitrary subtree of the coupled node tree, linking is repeated based on the search key's bit value at the discrimination bit position and information indicating a position of a primary node until a leaf node is reached; an index key stored in the leaf node is obtained as a search result key of the subtree by means of the search key.

23 Claims, 28 Drawing Sheets

OTHER PUBLICATIONS

Jung et al., "A Dynamic Construction Algorithm for the Compact Patricia Trie using the Hierarchical Structure", Information Processing & Management, vol. 38, No. 2, Mar. 1, 2002, pp. 221-236.

Communication from European Patent Office for Application No. 07827899.1-1225 dated Feb. 19, 2010.

Daichi Goto, "*Sawatte Manabu Data Kozo, Tsukatte Mini Tsuku Algorithm Kochira Java API Kenkusho!*" Java Press, vol. 34, pp. 202-210 (Feb. 15, 2004).

R. Sedgewich, Algorithm, vol. 1, 1st edition, Kindai Kagaku Sha Co., Ltd. pp. 49-54 (Oct. 10, 1990).

Shigeaki Yazaki, "*Zu De Wakaru! Programming No. 10 Dai Kisochishiki Data Kozo,*" Nikkei Software, vol. 6, No. 2, pp. 44-45 (Jan. 24, 2003).

English translation of Office Action issued by Japan Patent Office in connection with Application No. 2006-293619 to show relevance of Documents BA, BD and CA-CC.

"*Patorishia tsuri (Patricia Tree)*", vol. 11, No. 2, pp. 337-339, Journal of Japanese Society for Artificial Intelligence (Mar. 1, 1996).

Akira Nakamori, "*Memori no Gainen wo Rikai suru (Understanding Memory Concept),*"vol. 32, No. 2, pp. 44-53, Interface (Feb. 2, 2006) (in particular, the portion of the article entitled "Hairetsu o Shitei suruto Memory Ryoiki o Kakuho suru," pp. 49-50 of the same.).

Alfred V. Aho et al., "*Arugorizumu no Sekkei to Kaiseki I (The Design and Analysis of Computer Algorithms I)*, First Edition", pp. 132-136, Saiensu-Sha Co. Ltd., Japan (Oct. 30, 1977).

International Search Report (Aug. 14, 2007).

International Search Report (Jan. 8, 2008).

Nilsson et al., "IP-Address Lookup Using LC-Tries", IEEE Journal on Selected Areas in Communications, vol. 17, No. 6, Jun. 1999, pp. 1083-1092.

\* cited by examiner

BIT STRING SEARCHING APPARATUS, SEARCHING METHOD, AND PROGRAM

CROSS-REFERENCE TO RELATED APPLICATION

This application is a continuation of PCT/JP2007/001120 filed on Oct. 16, 2007, pending, and is a continuation-in-part of U.S. patent application Ser. No. 12/308,560 filed on Dec. 18, 2008, pending, which is a continuation of PCT/JP2007/000639 filed on Jun. 15, 2007. The present application is based and claims the benefit of priority of the prior Japanese Patent Application Nos. 2006-187827 and 2006-293619, filed on Jul. 7, 2006 and Oct. 30, 2006 respectively, the entire contents of which are incorporated herein by reference. The contents of U.S. patent application Ser. No. 12/308,560, PCT/JP2007/001120 and PCT/JP2007/000639 above are incorporated herein by reference in their entirety.

BACKGROUND OF THE INVENTION

1. Field of the Invention

The present invention relates to a searching apparatus that searches for a desired bit string from a set of bit strings, and more particularly to a field of art in which refinement is done to the data structure in which bit strings are stored to effect an improvement in searching speed and the like.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database. In order to perform the above-noted searching for bit strings at high speed, conventional art makes various refinements on the data structure in which bit strings are stored. One of these is a tree structure known as a Patricia tree.

FIG. 1 describes an example of a Patricia tree used for searching processing in the above-noted conventional art. A node of a Patricia tree is formed to include an index key, a test bit position for a search key, and right and left link pointers. Although it is not explicitly described, a node of course includes information for the purpose of accessing a record corresponding to the index key.

In the example described in FIG. 1, the node 1750$a$ that holds the index key "100010" is a root node, the test bit position 1730$a$ of which is 0. The node 1750$b$ is connected to the left link 1740$a$ of the node 1750$a$, and the node 1750$f$ is connected to the right link 1741$a$ of the node 1750$a$.

The index key held by the node 1750$b$ is "010011," and the test bit position 1730$b$ is 1. The node 1750$c$ is connected to the left link 1740$b$ of the node 1750$b$, and the node 1750$d$ is connected to the right link 1741$b$ of the node 1750$b$. The index key held by the node 1750$c$ is "000111," and the test bit position is 3. The index key held by the node 1750$d$ is "011010," and the test bit position is 2.

The parts connected to the node 1750$c$ by a solid lines show the right and left link pointers of the node 1750$c$, and the left pointer 1740$c$ that is not connected by the dotted line indicates that that field is blank. The dotted line connection destination of the right pointer 1741$c$ that is connected by a dotted line expresses the address indicated by the pointer, and in this case this indicates that the right pointer points to the node 1750$c$.

The right pointer 1741$d$ of the node 1750$d$ points to the node 1750$d$ itself, and the node 1750$e$ is connected to the left link 1740$d$. The index key held by 1750$e$ is "010010," and the test bit position is 5. The left pointer 1740$e$ of the node 1750$e$ points to the node 1750$b$, and the right pointer 1741$e$ of the node 1750$e$ points to the node 1750$e$.

The index key held by the node 1750$f$ is "101011," and the test bit position 1730$f$ is 2. The node 1750$g$ is connected to the left link 1740$f$ of the node 1750$f$ and the node 1750$h$ is connected to the right link 1741$f$ of the node 1750$f$.

The index key held by the node 1750$g$ is "100011," and the test bit position 1730$g$ is 5. The left pointer 1740$g$ of the node 1750$g$ points to the node 1750$a$, and the right pointer 1741$g$ of the node 1750$g$ points to the node 1750$g$.

The index key held by the node 1750$h$ is "101100," and the test bit position 1730$h$ is 3. The left pointer 1740$h$ of the node 1750$h$ points to the node 1750$f$, and the right pointer 1741$h$ of the node 1750$h$ points to the node 1750$h$.

In the example of FIG. 1, the configuration is such that, as the tree is traversed downward from the root node 1750$a$ the test bit position of successive nodes increases.

When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0. Unless the test bit position of a link target node is larger than the bit position of the link origin node, that is, if the link target is not below but rather returns upward (the returning links described by the dotted lines in FIG. 1 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

Art such as disclosed in Japanese Laid-Open Patent Application Publication 2001-357070 exists as an attempt to solve these problems of the Patricia tree. In the Patricia tree described in Japanese Laid-Open Patent Application Publication 2001-357070, in addition to reducing the storage capacity for pointers by storing in the downstream left and right nodes in contiguous regions, the back link decision processing is reduced by providing a bit at each node that indicates whether the next link is or is not a back link.

Even in the art disclosed in Japanese Laid-Open Patent Application Publication 2001-357070, however, because one node always occupies an index key region and a pointer region, and because there is one pointer by storing down string left and right nodes in contiguous regions, there is not that great an effect of reducing the storage capacity, for example, it being necessary to assign the same capacity to the left pointer 1740$c$ and the right pointer 1741$h$, which are lowermost parts in FIG. 1. In addition, there is no improvement of the problem of delay in search processing caused by back links, and the difficulty of adding and deleting a node.

SUMMARY OF THE INVENTION

In order to resolve the problems in the above-noted conventional art, in the prior Japanese Patent Application No. 2006-187827, filed on Jul. 7, 2006, which is the base of the priority claiming for the above mentioned U.S. patent application Ser. No. 12/308,560, the inventor proposes a bit string search method using a coupled node tree, which tree is a tree structure for bit string searches formed by a root node and a node pair stored in adjacent areas that is formed by a branch node and a leaf node, branch nodes, or leaf nodes; the root node representing the start point of the tree and being a leaf node if there is only one node in the tree and being a branch node if there are two or more nodes in the tree; the branch node including a discrimination bit position in the search key and information indicating a position of one node of a node pair of a link target; and the leaf node containing index key that is a bit strings of a possible search target.

The above cited patent application describes a method for creating a coupled node tree from a set of received index keys and basic search methods using a coupled node tree, such as methods for searching for a single index key from that coupled node tree, etc.

Here we note that the bit string searches may also include various kinds of search requests, such as requests to find a minimum value or maximum value or searches for a value within a given range, etc.

A purpose of the present invention is to provide an easy-to-use, high-speed method for searches with a wide range of applications such as finding from the set of targeted bit strings the maximum value or the minimum value or a value within a given range, etc., using a coupled node tree, which requires a smaller amount of storage capacity, performs searching at high speed, and features a data structure that is easy to maintain.

First, as the basic illustrative embodiment of the present invention, the bit string search proposed in the above-cited application provides an expanded bit string search method wherein any subtree of the coupled node tree can be found by specifying a node as the search start point.

As one illustrative embodiment of the present invention, taking any node in the coupled node tree as the start node for a search and by linking from only the primary node of the node pair or only the secondary node of the node pair, when a leaf node is reached, the minimum or maximum index key value for any subtree which has the search start node as its root node is obtained.

As another illustrative embodiment of the present invention, the above cited coupled node tree is stored in an array and the position information is the array element number of the array element of the array in which is stored the node corresponding to the position information, and the array element number of the array element stored in the above cited search start node and array element numbers of array elements stored in the link targets until the leaf node is reached are successively storied in a stack. Then after obtaining the minimum value or maximum value of the index keys in the coupled node tree, the index keys in the coupled node tree can be output in ascending order or descending order by executing a pop operation on the stack and successively obtaining the next smallest or next largest values following the above cited minimum or maximum value.

As another illustrative embodiment of the present invention, if a value of lower limit key input to specify a lower limit of a search range is compared with the above cited minimum value and that lower limit key is larger than the minimum value of the index keys, an index key value equal to or larger than that lower value can be obtained by successively obtaining the index keys in the above cited ascending order and comparing them to the lower limit key, setting the smallest index key among the index keys with a value large than the lower limit as the lower limit of the above cited search range. Or if a value input to specify a limit of a search range is compared with the above cited maximum value of the index keys and that upper limit key is equal to or larger than the maximum value of the index keys, the maximum value of the index keys can be set as the upper limit of the above cited index range, and if the upper limit is smaller than the maximum value of the index keys an index key value equal to or larger than that upper value can be obtained by successively obtaining the index keys in the above cited descending order and comparing them to the upper limit key, setting the largest index key among the index keys with a value smaller than the lower limit as the upper limit of the above cited search range.

As another illustrative embodiment of the present invention, the index keys can be extracted in ascending order or descending order from a search range defined by the above cited upper limit to the lower limit.

Also, as another illustrative embodiment of the present invention, a prefix match search is provided which outputs index keys which have bit strings that have matching bits for a specified number of bits from the front, wherein, in order to set the above cited lower limit, a bit string with zeroes (0) set for all bits after a specified number of bits from the front is taken as the input lower limit key and, in order to set the above cited upper limit, a bit string with ones (1) set for all bits after a specified number of bits from the front is taken as the input upper limit key, thus deciding the search range.

According to the present invention, by using a coupled node tree, it is now possible to extract maximum/minimum values or index keys in ascending/descending order and to set the upper/lower limits of a search range for any set of bit strings, thus enabling methods that are easy to use and fast. Additionally, by combining these methods, it is now possible to quickly extract index keys in ascending/descending order from a specified range or quickly extract index keys that partially match a search key.

BRIEF DESCRIPTION OF THE DRAWINGS

The foregoing and further objects, features, and advantages of the invention will become apparent from the following description of example embodiments with reference to the accompanying drawings, wherein like numerals are used to represent like elements, and wherein.

DESCRIPTION OF THE PREFERRED EMBODIMENTS

First the coupled node tree premised in this invention and proposed by this inventor previously in the above cited application is described using an example of storing a coupled node tree in an array. Although it is possible to use address information in a storage device as the data indicating the position of a link target held by a branch node, by using an array formed by array elements that can store the larger of the occupied storage capacity area between a branch node and a leaf node, it is possible to express the node position as an array element number, enabling a reduction of the amount of position information.

Figure 2:
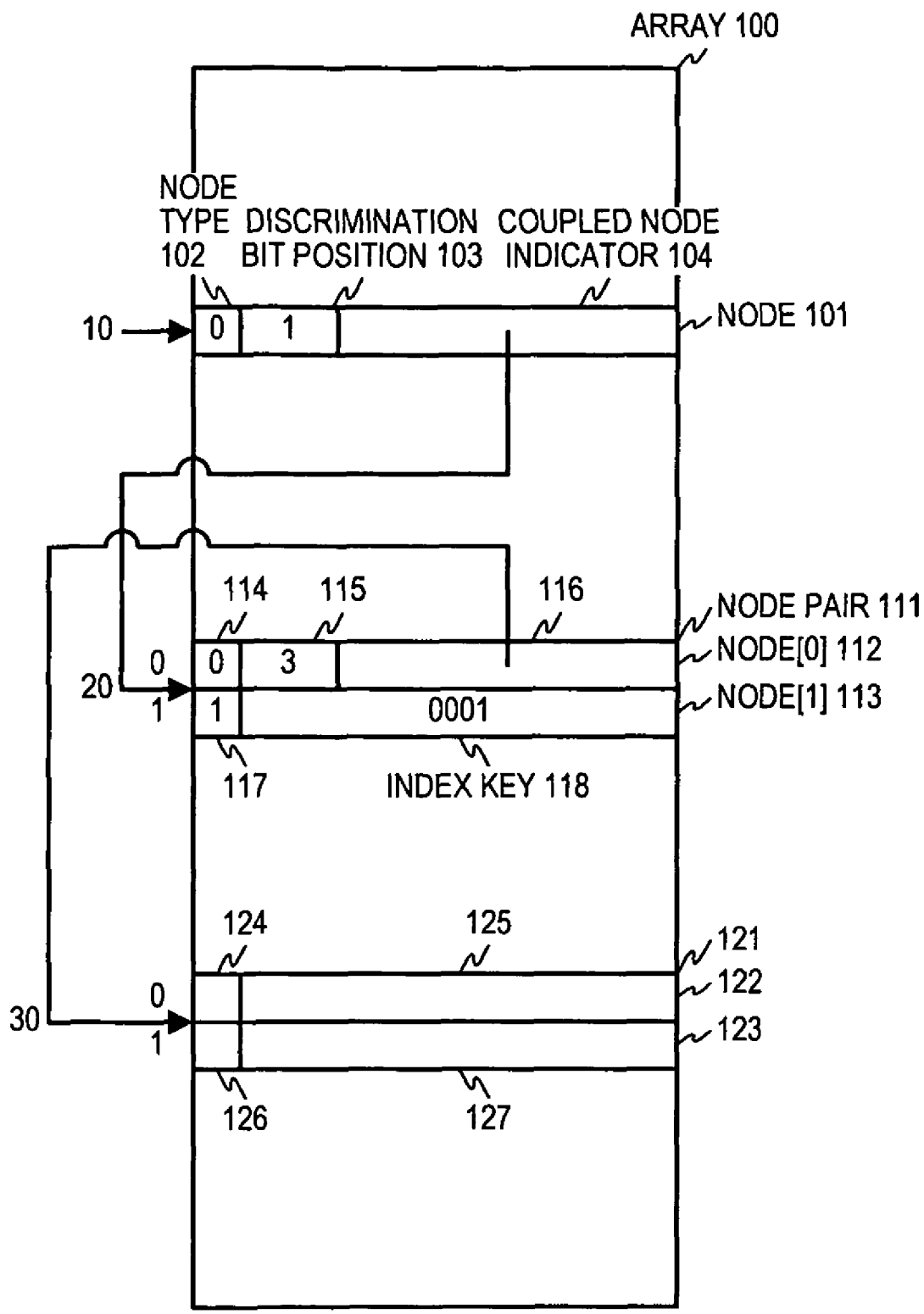
FIG. 2 is a drawing describing an exemplary configuration of a coupled node tree stored in an array.

FIG. 2 is a drawing that describes an exemplary configuration of a coupled node tree that is stored in an array.

Referring to FIG. 2, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0]112, which is the primary node of the node pair 111. The secondary node [1]113 forming a pair with the primary node is stored into the next, adjacent, array element (array element number 20+1). The value 0 is stored in the node type 114 of the node [0]112, the value 3 is stored in the discrimination bit position 115, and the value 30 is stored in the coupled node indicator 116. The value 1 is stored in the node type 117 of the node [1]113, thereby indicating that the node 1[113] is a leaf node. The value "0001" is stored in the index key 118. In the same manner as in a Patricia tree described above, although information for accessing a record corresponding to an index key is of course included in a leaf node, this is omitted from the notation.

Primary nodes are indicated as the node [0], and secondary nodes that are paired therewith are indicated as the node [1]. Also the node stored in an array element with some array element number is called the node of that array element number and the array element number stored in the array element of that node is also called the array element number of the node.

The contents of the node pair 121 formed by the node 122 and the node 123 that are stored in the array elements having array element numbers 30 and 31 are not shown.

The 0 or 1 that is appended to the node [0]112, the node [1]113, the node 122, and the node 123 indicates respectively to which node of the node pair linking is to be done when performing a search using a search key. Linking is done to the node having an array element number that is derived by adding the 0 or 1, which is the bit value of the search key at the discrimination bit position of the immediately previous branch node, to the coupled node indicator of the branch node.

Therefore, by adding the bit value of the discrimination bit position of the search key to the coupled node indicator of the immediately previous branch node, it is possible to determine the array element number of an array element storing a node at the link target.

Although in the above-noted example the smaller of the array element numbers at which the node pair is located is used as the coupled node indicator, it will be understood that it is also possible to use the larger of the array element numbers in the same manner.

Figure 1:
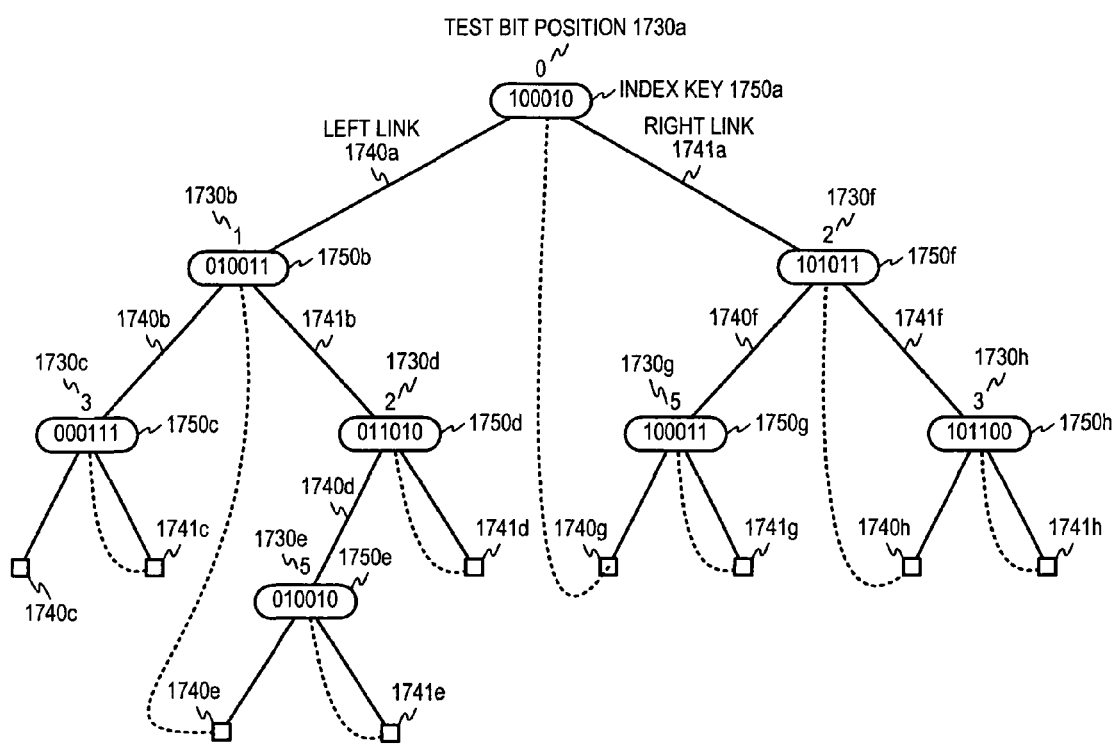
FIG. 1 is a drawing describing an example of a Patricia tree used in searching in the conventional art.
Figure 3:
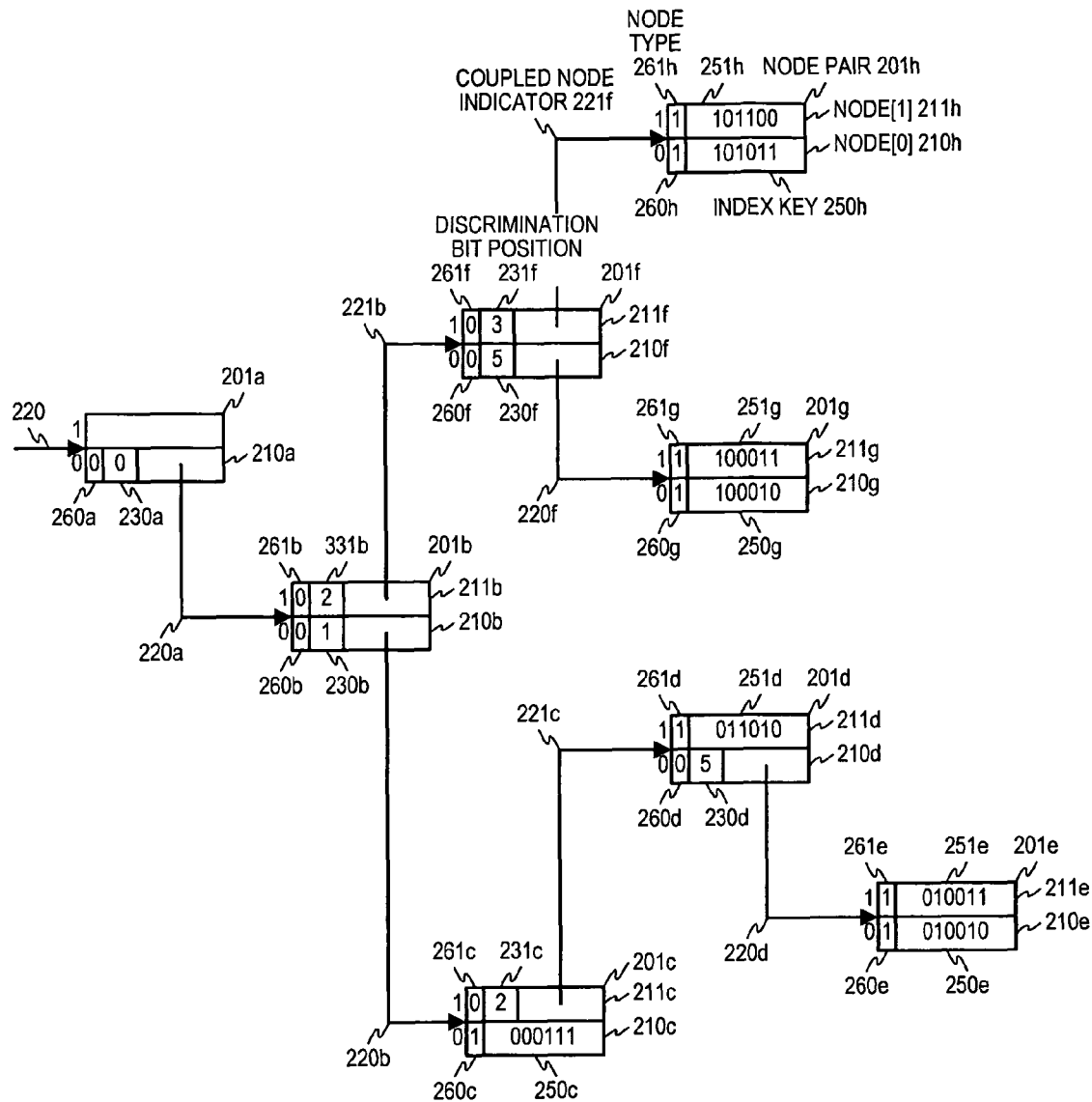
FIG. 3 is a drawing describing an embodiment of a tree structure of a coupled node tree.

FIG. 3 is a drawing that conceptually describes an embodiment of a tree structure of a coupled node tree. The 6-bit index key that is illustrated is the same that of the Patricia tree described as an example in FIG. 1.

The reference numeral 210a shows the root node. In the example described, the root node 210a is the primary node of the node pair 201a located at the array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the codes that are appended before the array element numbers described in FIG. 2. The tree is traversed in accordance with the bit values at discrimination bit positions of the search key, so that the leaf node of the search for item is found.

In the example described, the node type 260a of the root node 210a is 0, thereby indicating that this is a branch node, and the discrimination bit position 230a indicates 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The discrimination bit position 230b of the node 210b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes an index key. "000111" is stored in the index key 250c. The node type 261c of the node 211c is 0, the discrimination bit position 231c of the node 211c is 2, and in the coupled node indicator is stored the array element number 221c of an array element in which is stored the primary node 210d of the node pair 201d.

The node type 260d of the node 210d is 0, the discrimination bit position 230d of the node 210d is 5, and in the coupled node indicator is stored the array element number 220d of an array element in which is stored the primary node 210e of the node 201e. The node type 261d of the node 21d that is paired with the node 210d is 1, and "011010" is stored in the index key 251d.

The node types 260e and 261e of the nodes 210e and 211e of the node pair 201e are both 1, indicating that both are leaf nodes. In the index keys 250e and 251e of each are stored "010010" and "010011" respectively as index keys.

The discrimination bit position 231b of the node 211b, which is the other node of the node pair 201b, has 2 stored therein, and the array element number 221b of the array element in which is stored the primary node 210f of the node pair 201f is stored in the coupled node indicator of the link target.

The node types 260f and 261f of the nodes 210f and 211f of the node pair 201f are both 0, indicating that both are branch nodes. In the discrimination bit positions 230f and 231f of each are stored 5 and 3, respectively. The array element number 220f of the array element in which is stored the primary node 210g of the node pair 201g is stored in the coupled node indicator of the node 210f, and the array element number 221f of an array element in which is stored the node [0]210h, which is the primary node of the node pair 201h, is stored in the coupled node indicator of the node 211f.

The node types 260g and 261g of the nodes 210g and 211g of the node pair 201g are both 1, indicating that both are leaf nodes, and "100010" and "100011" are stored in the index keys 250g and 251g thereof, respectively.

In the same manner, the node types 260h and 261h of the node [0]210h of the node pair 201h, and the node [1]211h, which is paired therewith, are both 1, indicating that both are leaf nodes, and "101011" and "101100" are stored in the index keys 250h and 251h thereof, respectively.

The processing flow in searching for the index key "100010" from the above-noted tree is briefly described below. The discrimination bit positions are numbered 0, 1, 2, . . . and so on from the left.

First, processing is started from the root node 201a using the bit string "100010" as the search key. Because the discrimination bit position 230a of the root node 210a is 0, examining the bit value of the discrimination bit position 0 reveals 1. This being the case, 1 is added to the array element number 220a stored in the coupled node indicator and linking is done to the node 211b stored in the resulting array element number. Because 2 is stored in the discrimination bit position 231b of the node 211b, examination of the bit value of the discrimination bit position 2 reveals 0, resulting in linking to the node 210f stored in the array element having the array element number 221b stored in the coupled node indicator.

Because 5 is stored in the discrimination bit position 230f of the node 210f, and because examination of the bit value of the discrimination bit position 5 of the search key "100010" reveals 0, linking is done to the node 210g stored in the array element having the array element number 220f stored in the coupled node indicator.

Because the node type 260g of the node 210g is 1, indicating a leaf node, the index key 250g is read out and a comparison is performed with the search key, thereby revealing coincidence between the two, both of which are "100010". Searching is performed in this manner using the coupled node tree.

Next, the significance of the configuration of the coupled node tree will be described, with reference made to FIG. 3.

The configuration of the coupled node tree is defined according to a set of index keys. In the example of FIG. 3, the discrimination bit position of the root node 210a is 0 because there is an index key having a 0 at the 0th bit and an index key having a 1 at the 0th bit in the index keys described in the embodiment example of FIG. 3. The group of index keys having 0 at the 0th bit is classified under the node 210b, and the group of index keys having 1 at the 0th bit is classified under the node 211b.

That the discrimination bit position of the node 211b is 2 reflects a property of the index keys, this being that the 1st bits of all the nodes 211h, 210h, 211g, and 210g are the same value 0, a difference therebetween first occurring at the 2nd bit.

Similar to the case of the 0th bit, the cases of the 2nd bit being 1 are classified on the node 211f side, and the cases of the 2nd bit being 0 are classified on the node 210f side.

Then because index keys having a 2nd bit that is 1 differ with regard to the 3rd bit, 3 is stored in the discrimination bit position of the node 211f, and because the 3rd and 4th bits of index keys having 0 as the 2nd bit are the same and differ at the 5th bit, 5 is stored in the discrimination bit position of the node 210f.

At the link target of the node 211f, because there is only one having a 3rd bit of 1 and one having a 3rd bit of 0, nodes 210h and 211h are leaf nodes, with "101011" and "101100" stored in the index keys 250h and 251h, respectively.

Even in the event that the index key set includes "101101" or "101110" in place of "101100," because there is equality with "101100" up until the 3rd bit, only the index key stored in the node 211h would change, there being no change in the structure of the tree itself. However, if "101101" is included in addition to "101100," the node 211h would become a branch node, the discrimination bit position thereof being 5. If the index key to be added is "101110," the discrimination bit position would be 4.

As described above, the coupled node tree structure is determined by the bit values of each bit position of the index keys included in the set of index keys.

To add to the above, because there is branching for each bit position having different bit values, meaning between a node that has a bit value of 1 and a node that has a bit value of 0, if the leaf nodes are traversed giving priority to the node [1] side and the tree depth direction, the index keys stored therewithin will be "101100" for the index key 251h of the node 211h, "101011" for the index key 250h of the node 210h, . . . , and "000111" for the index key 250c of the node 210c, these being sorted in descending order.

That is, in a coupled node tree the index keys are disposed in the tree in a sorted sequence.

When searching using a search key, the index key is followed over a path disposed on a coupled node tree, and in the case, for example of a search key "101100" it is possible to reach the node 211h. As can be imagined from the above-noted description, even if the search key is made "101101" or "101110," the node 211h will be reached, and a comparison with the index key 251h will result in the search failing.

Also, even in the case in which searching is done with "100100," in the link path of nodes 210a, 211b, and 210f, because the 3rd and 4th bits of the search key are not used and the 5th bit is 0, the node 210g will be reached, similar to the case searching with "100010." In this manner, the discrimination bit positions are used in accordance with bit makeup of the index keys stored in the coupled node tree to perform branching.

Figure 4:
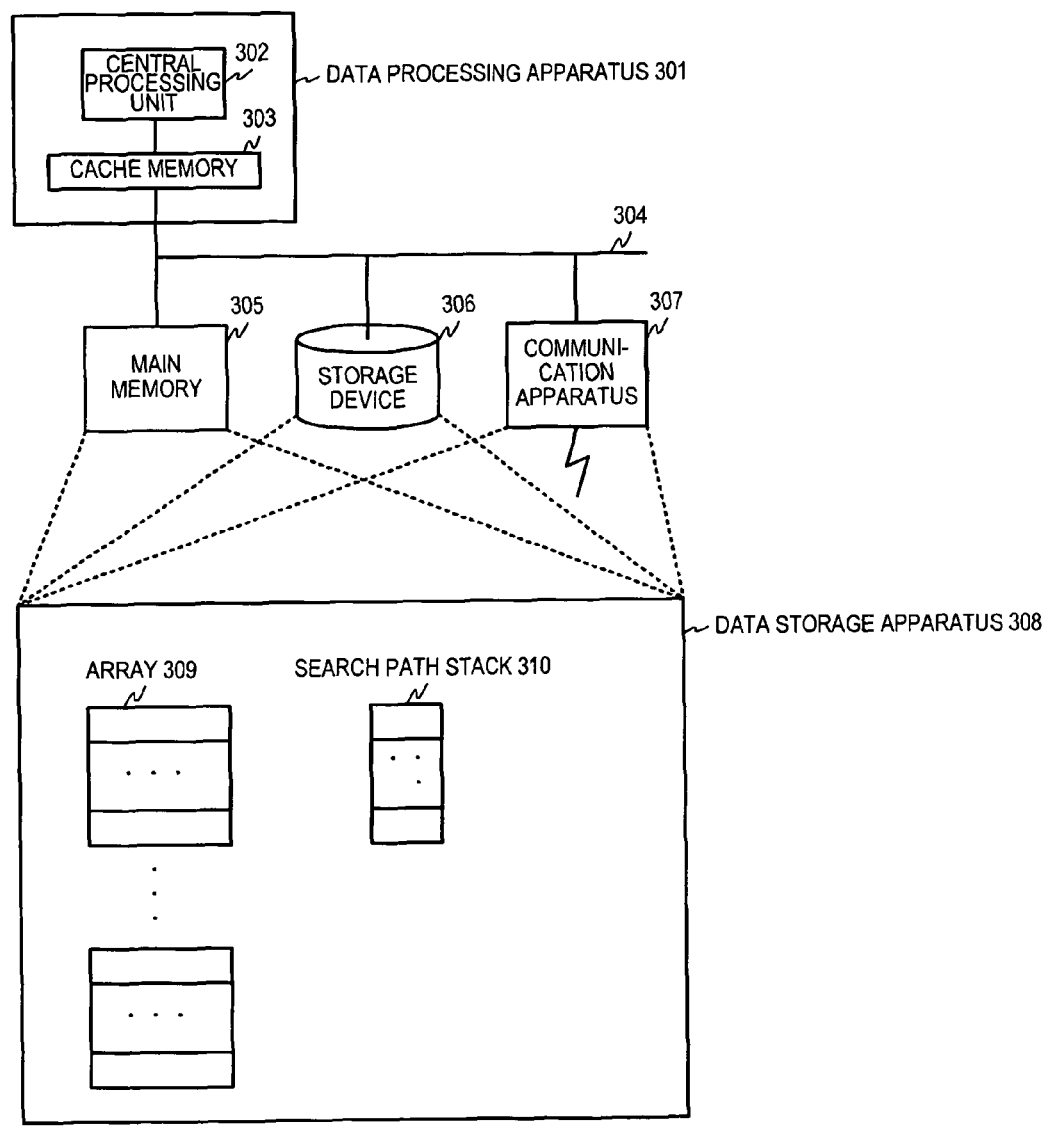
FIG. 4 is a drawing describing an exemplary hardware configuration for embodying the present invention.

FIG. 4 is a drawing describing an example of a hardware configuration for embodying the present invention.

Search processing and data maintenance are implemented with the searching apparatus of the present invention by a data processing apparatus 301 having at least a central processing unit 302 and a cache memory 303, and a data storage apparatus 308. The data storage apparatus 308, which has an array 309 into which is disposed a coupled node tree, and a search path stack 310, into which are stored array element numbers of nodes which are traversed during the search, can be implemented by a main memory 305 or a storage device 306, or alternatively, by using a remotely disposed apparatus connected via a communication apparatus 307.

In the example described in FIG. 4, although the main memory 305, the storage device 306, and the communication apparatus 307 are connected to the data processing apparatus 301 by a single bus 304, there is no restriction to this connection method. The main memory 305 can be disposed within the data processing apparatus 301, and can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing.

Hereinafter the various processing for searching for index keys stored in the above cited coupled node tree will be described concretely with reference to the drawings.

Figure 5:
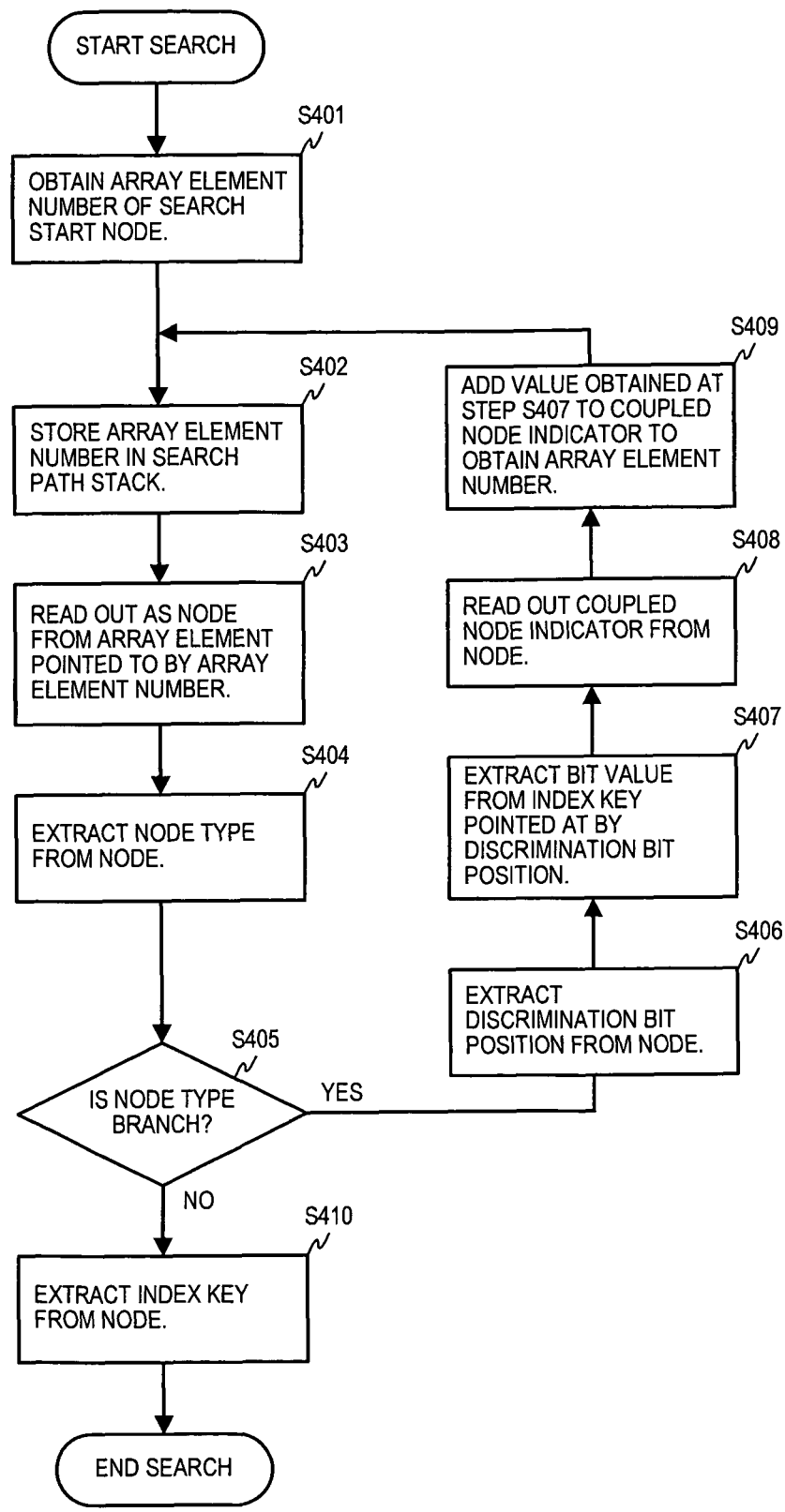
FIG. 5 is an example flowchart of the basic search processing in an embodiment of the present invention.

FIG. 5 is an example flowchart of the basic search processing in an embodiment of the present invention.

First, in step S401 the array element number of the search start node is acquired. The search start node can be any node configuring the coupled node tree and it is stored in the array position that corresponds to the obtained array element number. How the search start node is specified will be described later in the descriptions of the various search applications.

Next, at step S402, the array element number acquired is stored on the search path stack 310. Proceeding to step S403, the array element of the array element number is read out as a node to be referenced. At step S404, the node type is extracted from the read out node. Next at step S405, a determination is made as to whether the node type is a branch node or not.

If the determination made at step S405 is that the node type is a branch node, processing proceeds to step S406. At step S406, the discrimination bit position is extracted from the node. Next, at step S407, the bit value of the search key at the discrimination bit position extracted at step S406 is obtained. Next, proceeding to step S408, the array element number of the primary node of the node pair of the link target is obtained from the node. Then, proceeding to step S409, the bit value obtained at step S407 is added to the array element number obtained at step S408, thereby obtaining the array element number of the link target node, and return is made to step S402.

Thereafter, the processing from step S402 to step S409 is repeated until the determination at step S405 is that the node is a leaf node and processing proceeds to step S410. At step S410, the index key is extracted from the leaf node, and processing ends.

The processing described in FIG. 5 differs with the search process based on the coupled node tree proposed in the above cited previous application by the same inventor in the point that the node can be any node in the coupled node tree, not limited to the root node being the search start node and the point that the index key extracted from the search result node, with no decision of search success or failure based on a comparison of the search key with index key stored in the node that is the result of the search.

The reason for the first point of difference above is that, in the search applications provided by this invention, there are times when a search takes place in a subtree of the coupled node tree as will be explained later. The reason for the second point of difference is that, in the same way, the search application examples of ascending/descending value searches, range searches, and so forth provided by this invention differ from searching for a single search key in the tree.

Figure 6:
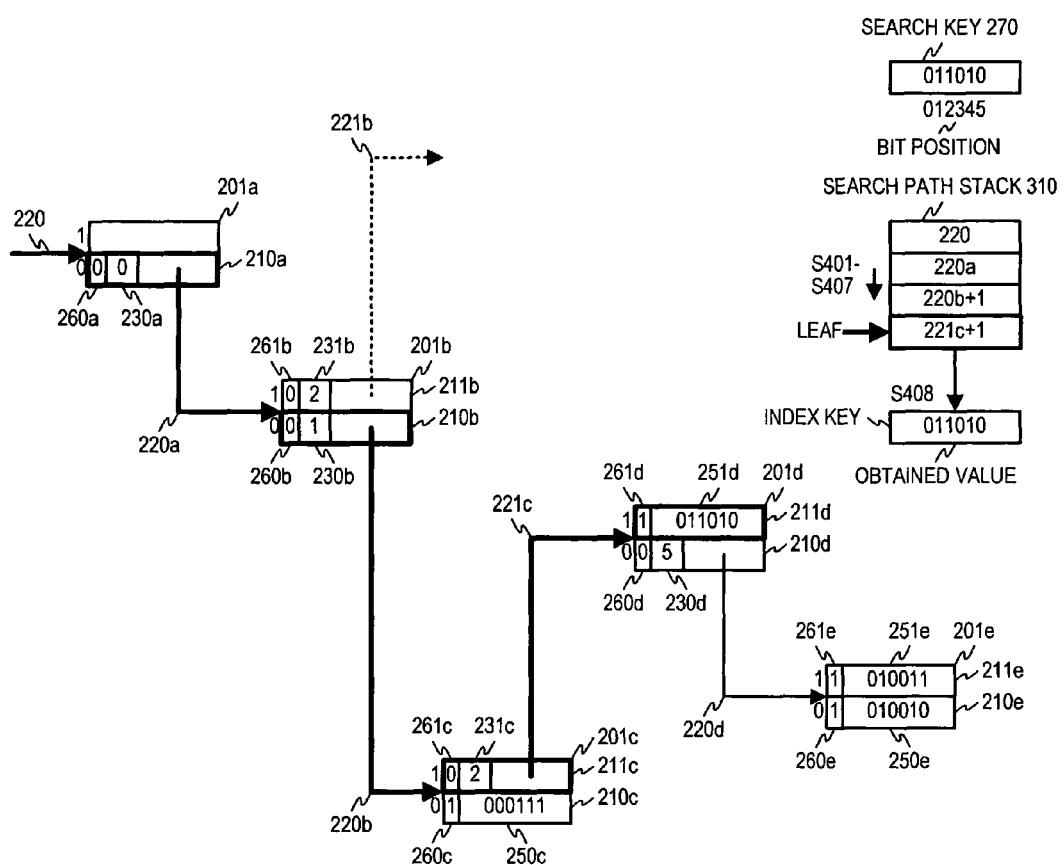
FIG. 6 is a drawing describing exemplarily the basic search processing, based on a coupled node tree.

FIG. 6 is a figure describing exemplarily the basic operations of a bit string search related to the embodiment of this invention described in the flowchart of FIG. 5 based on the coupled node tree embodiment exemplified in FIG. 3.

In FIG. 6 is described a coupled node tree, the search key save area 270 and the search path stack 310. Hereinafter, the nodes referenced on the coupled node tree and the status of the search path stack will be described using FIG. 6.

Also, FIG. 6 only describes the parts of the coupled node tree described in FIG. 3 that are necessary to explain the processing in FIG. 5. An explanation of the remaining nodes (the nodes from primary node number 221b and below) is omitted. Henceforth, the same applies to explanations of drawings intended to explain nodes referenced on a coupled node tree.

First, assume that the array element number 220 is set as the array element number of the node for starting the search. Then the corresponding array element number 220 is pushed onto the search path stack 310 and the various information in the array element is referenced.

Based on the information stored in the array, when it is recognized that the node with the array element number 220 is a branch node and does not contain an index key, reference is again made to information (coupled node indicator or discrimination bit position or others) stored in the array for array element number 220 and array element number to be referenced next is computed. Here the array element number 220 is stored in search path stack 310 and the node type for node 210 with array element number 220 is extracted. Since the extracted node type is branch node, the discrimination bit position "0" is extracted from node 210*a* and then the bit value "0" is extracted from the discrimination bit position in the search key "011010" in the search key save area 270. Then the coupled node indicator 220*a* stored in node 210*a* is extracted and added to the bit value previously extracted from the discrimination bit position of the search key and the value obtained "220*a*" is stored in the search path stack 310.

Next, when the node type is read out from the node with array element number 220*a*, since node 210*b* of array element number 220*a* is a branch node, when the bit value corresponding to the node discrimination bit position "1" is extracted from the search key "011010" the value is "1". Then the bit value "1" obtained is added to the coupled node indicator 220*b* of node 210*b* and "220*b*+1" is stored in the search path stack 310.

Since the node type read out from the node 211*c* of the array element number "220*b*+1" is a branch node when the bit value corresponding to the node discrimination bit position "2" is again extracted from the search key "011010" the value is "1". The bit value "1" obtained is added to the coupled node indicator 221*c* of node 211*c* and "221*c*+1" is stored in the search path stack 310.

When the node type is extracted from node 211 of the array element number "221*c*+1", node 211 is found to be a leaf node. Then the index key "011010" is extracted from node 211 and processing is terminated.

In this way, by referring to the information in each node successively and executing link processing, the array element numbers from the array element number 220 of node 210*a*, which is the search start node, to the array element number 221*c*+1 of leaf node 211*d* are pushed into search path stack 310 in the link sequence.

With that, the specifics of the basic operations of bit string searches and of the coupled node tree that is the foundation of the search applications of this invention have been described. The generation of a coupled node tree has not been specifically described in drawings but as was described in the above cited application by this inventor, when there is a set of bit strings, the tree can be generated by repeating the operation of extracting any bit string successively from that set and inserting it into the tree as an index key.

As is described above, from the fact that an index key value stored in a coupled node tree will be placed in the tree sorted in descending order by traversing the node [1] side down the tree, the index key insertion processing consists of taking the index key to be inserted as a search key and searching a coupled node tree for the corresponding leaf node, and successively storing in a stack the array element number of the array elements stored in the branch node and related leaf node of the link path from traversing the tree until reaching the related leaf node, and by making a value comparison between the search key and the index key contained in the corresponding leaf node, the insertion position of the node pair composed of the leaf node containing the index key to be inserted and another node is decided by the relative position relation between the discrimination bit positions of the branch nodes stored in the stack and the first bit position that differs in the bit string comparison, and the above value relationship determines into which of the nodes within a node pair the leaf node that contains the index should be inserted.

Next the processing of the various applications of the search processing of this invention is described.

Figure 7:
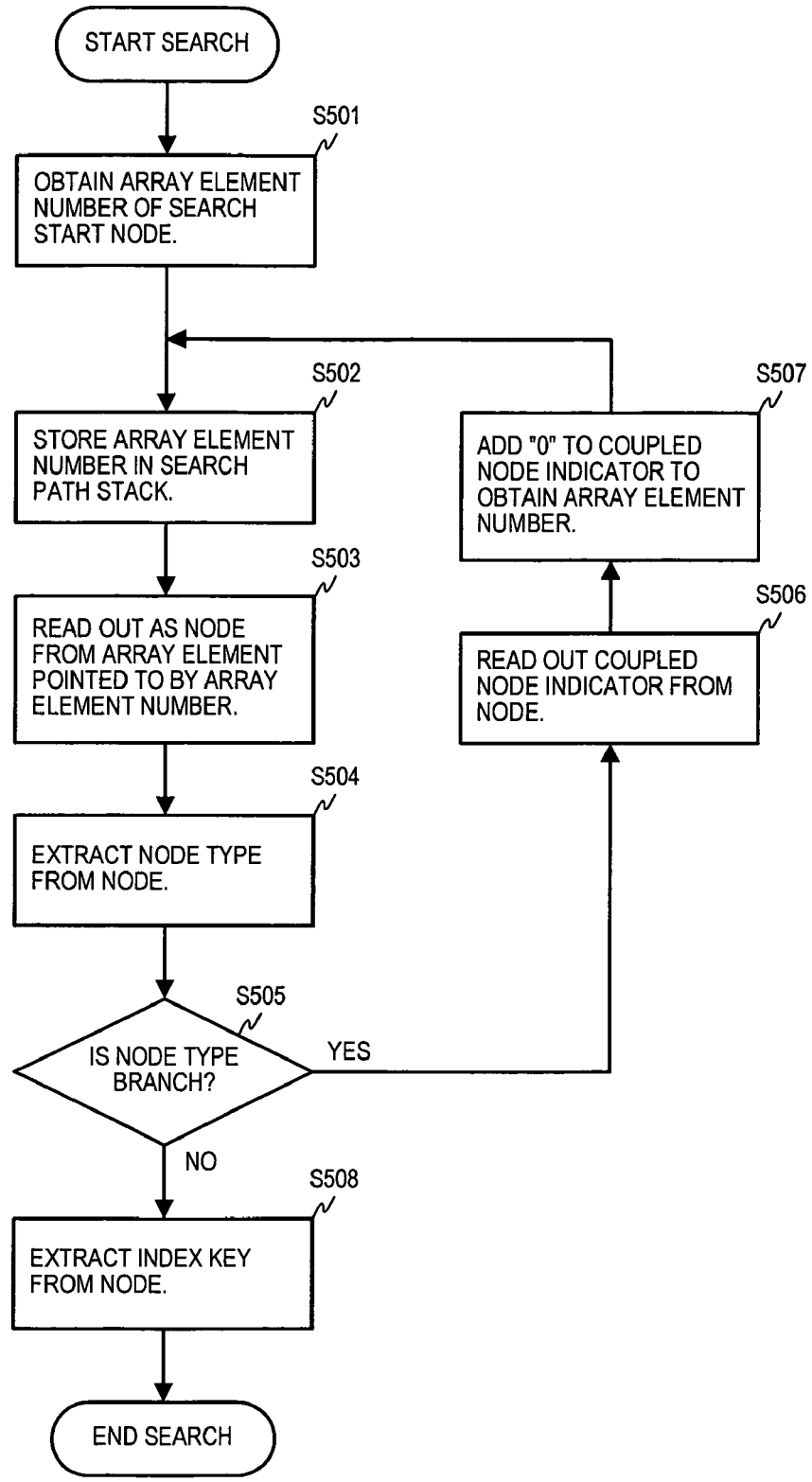
FIG. 7 is an example flowchart of the processing when requesting the minimum index key value stored in a coupled node tree.

FIG. 7 is an example flowchart of the processing for determining the minimum value of the index key stored in the coupled node tree (including a subtree). From the disposition of index keys on the tree as described above, the processing to determine the minimum value of index key corresponds to traversing node [0] from the search start node until reaching the leaf node.

First, from the obtaining of the array element number of the search start node at step S501 until the node type determination at step S505 is similar to the processing from step S401 to step S405 of FIG. 5

If the node type is determined to be branch node at the node type determination made at step S505, processing proceeds to step S506, at which the coupled node indicator of the array is extracted from the node and, at step S507, the value "0" is added to the extracted coupled node indicator and taken as the new array element number, after which return is made to step S502. Thereafter, the processing from step S502 to step S507 is repeated until the node is determined to be leaf node at step S505, and at step S508 the index key is extracted from the leaf node, at which time processing ends.

In the above-noted processing described in FIG. 7, in order to traverse the node [0], "0" is always added to the coupled node indicator. That is, according to the processing of FIG. 7, the node of a link target is always taken as the node [0] of a node pair, and branching is done to the node storing the index key with the smaller value. By doing this, the tree structure enables extraction of the minimum index key of the coupled node tree, which is a sequentially configured as described above.

Figure 8:
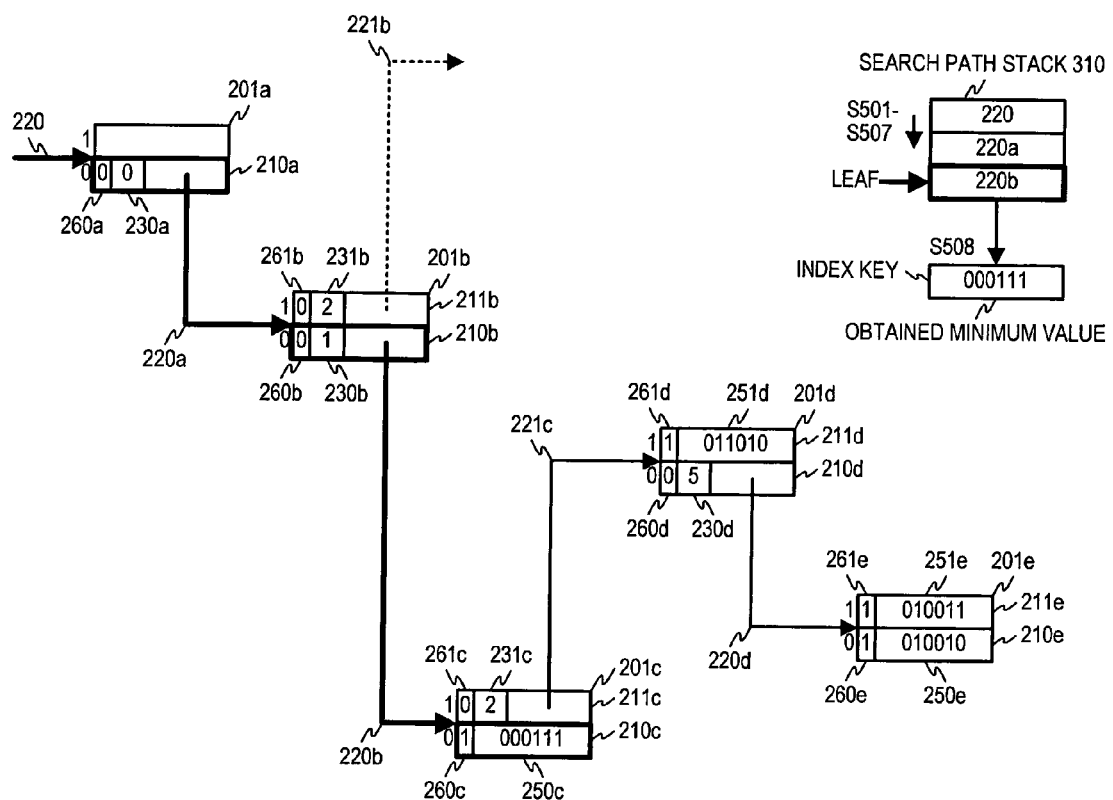
FIG. 8 is a drawing describing exemplarily the processing for a coupled node tree when requesting the minimum key value.

FIG. 8 is a drawing explaining the processing, described in the flowchart of FIG. 7, to obtain the minimum value of an index key from a coupled node tree embodiment exemplified in FIG. 3. FIG. 8 describes the status of the search path stack 310 and the array element number read out when node 210*a* of array element number 220 is taken as the search start node.

Linking is done successively from the search start node 210*a* to the node (node [0]) in the node pair referenced by coupled node indicator and for which node type 102 is set as [0]. The link targets, array element numbers 220, 220*a*, and 220*b*, are pushed into the search path stack 310, the index key "000111" of the leaf node with array element number 220*b* is extracted, and processing is terminated.

The array element numbers of the node [0] of the node pair are successively pushed into search path stack 310. At this time the link processing by referencing only an array element (the node type) of the array and the push operation on search path stack 310 occur.

Figure 9:
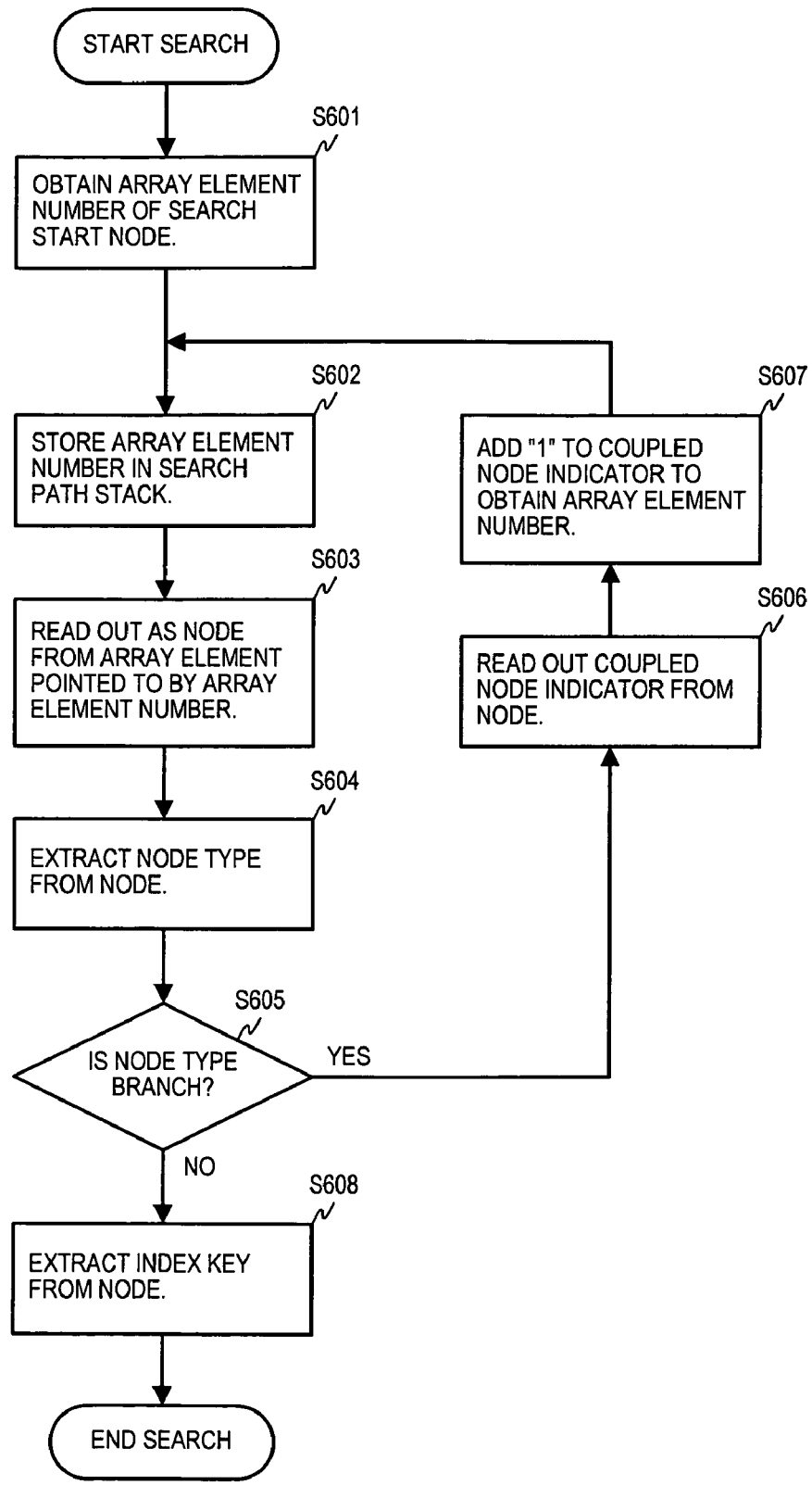
FIG. 9 is an example flowchart of the processing when requesting the maximum index key value stored in a coupled node tree.
Figure 10:
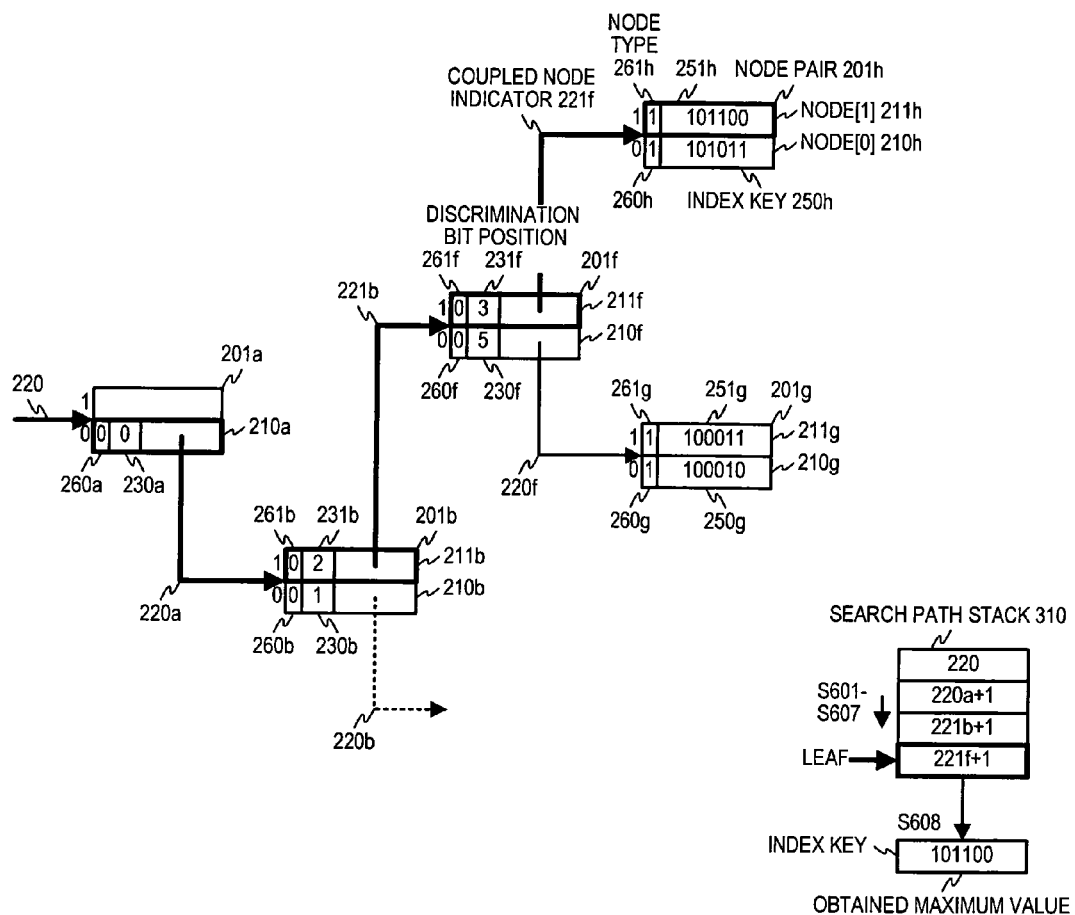
FIG. 10 is a drawing describing exemplarily the processing for a coupled node tree when requesting the maximum key value.

FIG. 9 is an example flowchart of the processing to obtain the maximum value for the index keys stored in a coupled node tree (including a subtree). FIG. 10 is a drawing describing the same processing using the coupled node tree embodiment exemplified in FIG. 3. The processing to determine the maximum index key value corresponds to sequentially traversing up until a leaf node, with regard to the node [1] of the nodes of the tree. The processing for determining the maximum index key is described below, with a comparison being made to the determining of the minimum index key, focusing on the points of difference therebetween.

Of the processing sequence described in FIG. 9, the processing from step S601 to step S606 and that of step S608 corresponds, respectively to, and performs similar processing as, the processing from step S501 to step S506 and that of step S508 in FIG. 7. The difference with respect to the processing in FIG. 7 for determination of the minimum value is that, at step S607, the value "1" is added to the coupled node indicator. By doing this, linking is always done to the node [1] of a node pair expressed by the coupled node indicator, and by repeating the processing successively from step S602 to step S607, it is possible to obtain the maximum value of the index key.

FIG. 10 is a drawing describing exemplarily the processing to obtain a maximum value of the index key described in the flowchart of FIG. 9 based on the coupled node tree embodiment exemplified in FIG. 3. As described in FIG. 10, if the search start node is taken as node 210a with the array position number 220 as in the example in FIG. 8, the link processing of a coupled node tree always takes the link to node [1] of the node pair and the array position numbers 220, (220a+1), (221b+1), and (220f+1) are pushed into the search path stack 310.

As described in FIG. 5 to FIG. 10, when executing the basic operation of searching for an index key that coincides with a search key and search processing for the minimum/maximum value of the index key, array element numbers are successively stored in the array elements referred to by the search path stack 310.

Also, in the search processing for the minimum/maximum value of the index key referencing FIG. 7 and FIG. 10, although the example used was that of the coupled node tree being stored in an array, it is not essential that the coupled node tree be stored in an array, it being clear that it is possible to search for the minimum/maximum value of an index key by linking to only the primary node of the two nodes forming a node pair or to only the secondary node located in a memory area adjacent thereto of the node pair in order to reach a leaf node.

Next, the search processing to obtain the minimum value and/or the maximum value of the above index keys and search applications using the information in search path stack 310 are explained.

Figure 11:
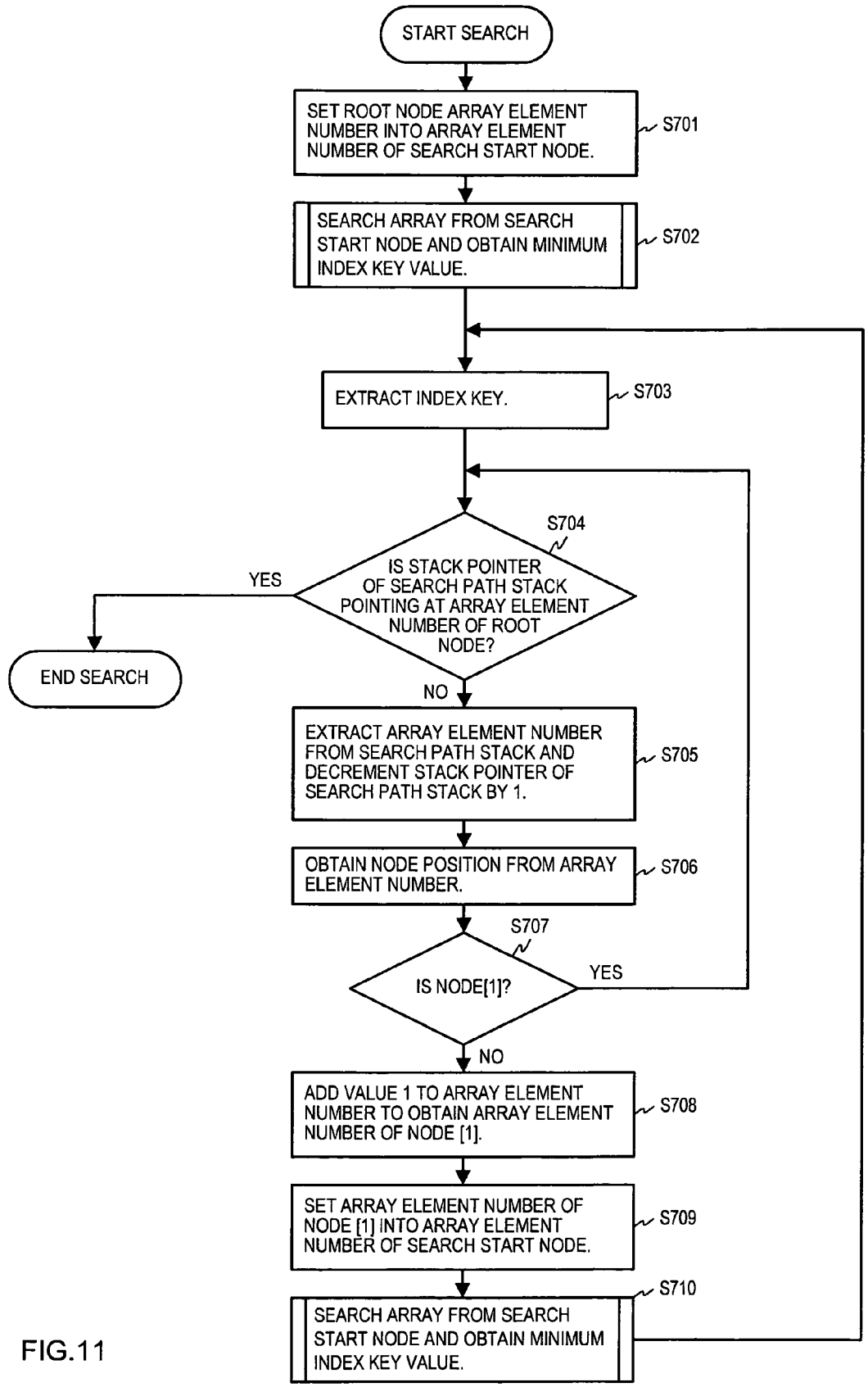
FIG. 11 is an example flowchart of the processing when fetching, in ascending order, index key values stored in a coupled node tree.

FIG. 11 is an example flowchart of the process to extract, in ascending order, index keys stored in the coupled node tree. The process to extract index keys in ascending order is equivalent to traversing the nodes successively, giving priority to the node [0] side of the node pairs and the tree depth direction, and extracting the index key from each leaf node.

First, in step S701, the array element number of the root node is set in the array element number of the search start node, and in step S702 the process to obtain the minimum index key explained using references to the above FIG. 7 and FIG. 8 is executed, and the minimum index key of all the index keys included in the coupled node tree is acquired. Then the index key obtained in step S703 is read out and processing proceeds to step S704.

In step S704 the search path stack 310 is referenced and a determination is made whether the stack pointer is pointing to the array element number of the root node. If the array element number pointed to by the pointer is other than that of the root node, processing proceeds to step S705. Then, in step S705, after extracting the array element number pointed to by the pointer from the search path stack 310, the pointer is decremented by 1. The reference to the search path stack 310 in step S704 above and the decrementing of the pointer after extracting the array element number pointed to by the pointer from the search path stack 310 in step S705 are executed by a pop operation on the stack. The same method applies to reading out array element numbers from the stack for each of the embodiments of the invention herein below.

In step S706, the node position of whichever of the two nodes in the node pair the array element is stored can be obtained from the array element number extracted in step S705. For example, by storing node [0] in the array element with an even position number in the array or other such, the node position can be obtained from array element number. Then, in step S707 a determination is made as to whether the node position obtained in step S706 is the node [1] side of the node pair or not. If in step S707 the determination is that it is the node [1] side, returning to step S704, processing is repeated from step S704 to step S707 until the node of the array element number pointed to by the pointer is either node [0] or the root node.

When in step S707 the determination was that it was a node [0] part, proceeding to step S708, "1" is added to the array element number and the array element number of the node [1] paired with that node is obtained. Then, in step S709, the array element number of node [1] obtained in step S708 is set as the search start node and in step S710, the processing to obtain the minimum index key from the subtree with the search start node as its root node is executed. The processing in step S710 is the same as that in step S702 and the minimum value search processing described in FIG. 7 is used.

When the minimum index is requested in step S710, returning to step S703, the requested index key is extracted and from then on, the same process is repeated until a determination can be made in step S704 that the pointer points to the array element number of the root node.

In this way, the array element number pointed by the pointer of search path stack 310 is referenced, and the node [1] that is a pair with the node [0] with the array element number stored in search path stack 310 is made the search start node and the minimum index key underneath that key is obtained. At the stage in step S702 wherein the minimum value is obtained, the pointer of search path stack 310 points to the array element number of the node that includes the minimum index key in the coupled node tree. Next a pop operation is executed on the search path stack 310 and the node [1] of the nodes for the array element number extracted is made the search start node and the minimum value for the index keys in the subtree for which the index start key is the root node is obtained, and the pop operations and minimum value search processing are repeated until the pop operation on search path stack 310 extracts the array element number of the root node of the coupled node tree.

Firstly in step S702, by obtaining the minimum value of the nodes underneath the root node, the array element numbers of the link path are successively stored in search path stack 310. For this reason, when the pointer for search path stack 310 is decremented by "1", and the node [1] is obtained that pairs with a node [0] which is among those nodes whose array element number is pointed to by the new pointer, and minimum value search processing is successively executed on the nodes beneath node [1], the index keys are extracted in ascending order.

Figure 12:
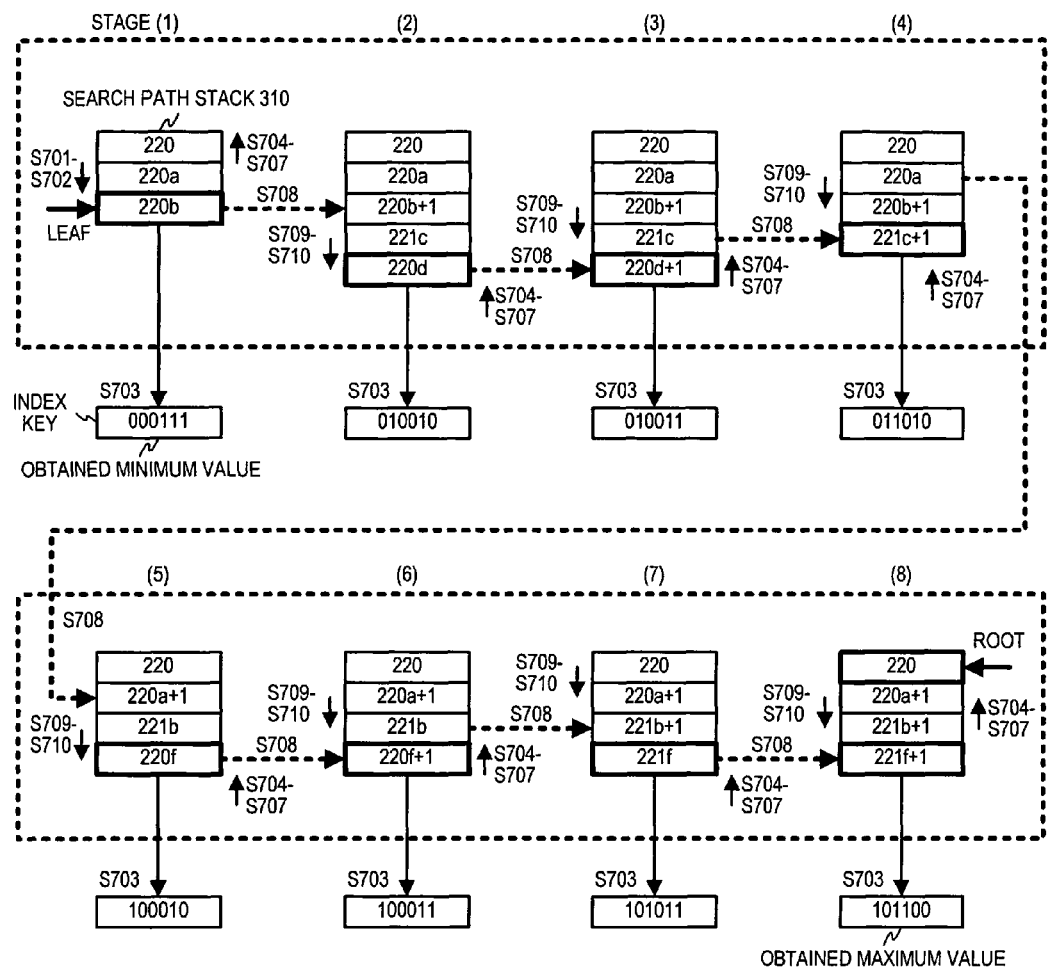
FIG. 12 is a drawing describing exemplarily the processing for fetching index key values in ascending order.

FIG. 12 is a drawing describing exemplarily the process for extracting index keys in ascending order described in the flowchart in FIG. 11. FIG. 12 describes the status of search path stack 310 and the index keys to be extracted for each of the stages wherein the process to extract index keys in ascending order is executed, and the array element numbers stored in search path stack 310 in the drawing correspond with those of the coupled node tree described in FIG. 3. Referencing FIG. 12, the array element numbers stored in search path stack 310 when index keys are extracted in ascending order from the coupled node tree described in FIG. 3 is described.

First, searching starts from the root node with a minimum value search. By traversing the node [0] of the node pairs in the coupled node tree, traversing reaches array element number 220b. At this point, the array element number 220 of the root node 210a, 220a, and 220b are stored in search path stack 310 in sequence.

Stage (1) in FIG. 12 describes search path stack 310 and the index key to be extracted in the stage wherein minimum value search processing is executed using array element number 220 as the search start node. Here, since the node pointed to by array element number 220b is a leaf node, the index key "000111" is extracted. Then since array element number 220b points to node [0], the array element number (220b+1) of the node [1] paired with this node [0] is used as the array element number of the next search start node.

Stage (2) in FIG. 12 describes search path stack 310 and the index key to be extracted in the stage wherein minimum value search processing is executed using array element number (220b+1) as the search start node. Here, since the node pointed to by array element number 220d is a leaf node, the index key "010010" is extracted. Then since array element number 220d points to node [0], the array element number (220d+1) of the node [1] paired with this node [0] is used as the array element number of the next search start node.

Stage (3) in FIG. 12 describes search path stack 310 and the index key to be extracted in the stage wherein minimum value search processing is executed using array element number (220d+1) as the search start node. Here, since the node pointed to by array element number (220d+1) is a leaf node, the index key "010011" is extracted. Next since array element number (220d+1) points to node [1], pop operations and array element number extractions are repeated until an array element number for a node [0] is obtained. Then when the array element number 221c pointed to by node [0] is obtained, the array element number (220c+1) of the node [1] paired with this node [0] is used as the array element number of the next search start node.

Stage (4) in FIG. 12 describes search path stack 310 and the index key to be extracted in the stage wherein minimum value search processing is executed using array element number (221c+1) as the search start node. Here, since the node pointed to by array element number (221c+1) is a leaf node, the index key "011010" is extracted. Next since array element number (221c+1) points to node [1], pop operations and array element number extractions are repeated until an array element number for a node [0] is obtained. Then when the array element number 221a pointed to by node [0] is obtained, the array element number (220a+1) of the node [1] paired with this node [0] is used as the array element number of the next search start node.

Stage (5) in FIG. 12 describes search path stack 310 and the index key to be extracted in the stage wherein minimum value search processing is executed using array element number (220a+1) as the search start node. Here, since the node pointed to by array element number 220f is a leaf node, the index key "100010" is extracted. Then since array element number 220f points to node [0], the array element number (220d+1) of the node [1] paired with this node [0] is used as the array element number of the next search start node.

Stage (6) in FIG. 12 describes search path stack 310 and the index key to be extracted in the stage wherein minimum value search processing is executed using array element number (221f+1) as the search start node. Here, since the node pointed to by array element number (221f+1) is a leaf node, the index key "100011" is extracted. Next since array element number (221f+1) points to node [1], pop operations and array element number extractions are repeated until an array element number for a node [0] is obtained. Then when the array element number 221b pointed to by node [0] is obtained, the array element number (221b+1) of the node [1] paired with this node [0] is used as the array element number of the next search start node.

Stage (7) in FIG. 12 describes search path stack 310 and the index key to be extracted in the stage wherein minimum value search processing is executed using array element number (221b+1) as the search start node. Here, since the node pointed to by array element number 221f is a leaf node, the index key "101011" is extracted. Then since array element number 221f points to node [0], the array element number (220f+1) of the node [1] paired with this node [0] is used as the array element number of the next search start node.

Stage (8) in FIG. 12 describes search path stack 310 and the index key to be extracted in the stage wherein minimum value search processing is executed using array element number (221f+1) as the search start node. Here, since the node pointed to by array element number (221f+1) is a leaf node, the index key "101100" is extracted. Thereafter pop operations and array element number extractions are repeated until a determination is made that the array element number points to the root and processing is terminated.

Figure 13:
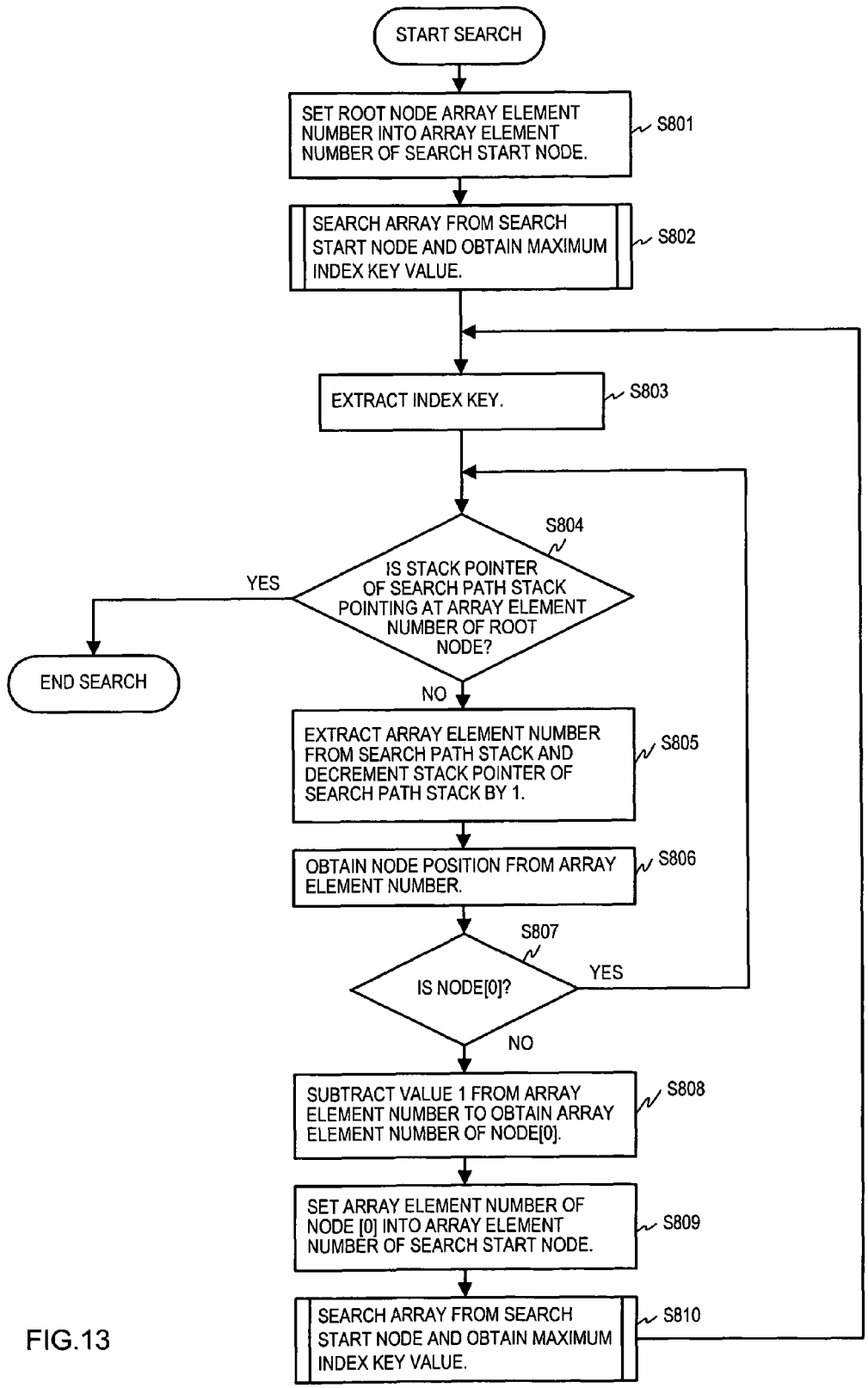
FIG. 13 is an example flowchart of the processing when fetching, in descending order, index key values stored in a coupled node tree.

FIG. 13 is an example flowchart of the processing for extracting, in descending order, the index keys stored in a coupled node tree. The process for extracting index keys in descending order corresponds to traversing from the root node sequentially to a leaf node, giving priority to the node [1] side and the tree depth direction. Here, the processing will be explained focusing on the points of difference in comparison with the extract processing of index keys in ascending order in FIG. 11.

In contrast to the above extract processing of index keys in ascending order, wherein, in step S702 and step 710 of FIG. 11, the minimum value of the index keys beneath the node with the array element number pointed to the pointer is obtained, the value obtained in step S802 and step S810 in FIG. 13 is the maximum value of the index keys beneath the node with the array element number pointed to the pointer.

Also, after the desired index key is extracted in step S703 of FIG. 11, the array element number of the node [0] of the array element numbers stored in search path stack 310 is obtained, the node [1] paired with that node is set as the search start node, and minimum value search processing is executed. In contrast to that, in the descending order extraction processing of FIG. 13, after the desired index key is extracted in step S803, the array element number of the node [1] of the array element numbers stored in search path stack 310 is obtained, the node [0] paired with that node is set as the search start node, and maximum value search processing is executed.

Figure 14:
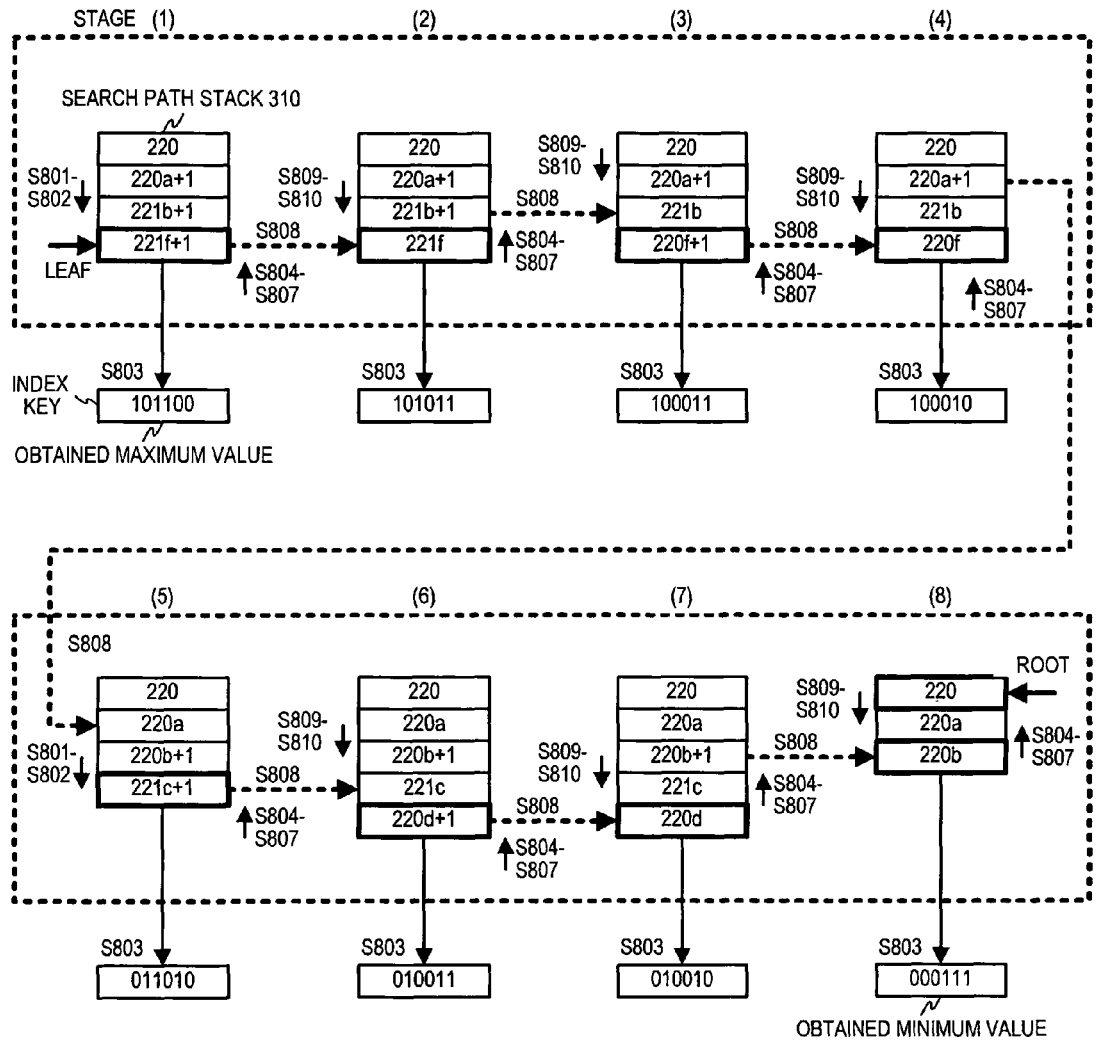
FIG. 14 is a drawing describing exemplarily the processing for fetching index key values in descending order.

FIG. 14 is a drawing explaining the process to extract, in descending order, index keys as described in the flowchart of FIG. 13. FIG. 14 describes search path stack 310 and the index key to be extracted in the stage wherein the process to extract index keys in descending order is executed and the array element numbers stored in search path stack 310 in the drawing correspond to those of the coupled node tree described in FIG. 3. Referencing FIG. 14, the array element numbers stored in search path stack 310 when index keys are extracted in descending order from the coupled node tree described in FIG. 3 is described.

First, searching starts from the root node with a minimum value search. By traversing the node [1] of the node pairs in the coupled node tree, traversing reaches array element number 221f. At this point, the array element number 220 of the root node 210a, (220a+1), (220b+1), and (220f+1) are stored in search path stack 310 in sequence.

Stage (1) in FIG. 14 describes search path stack 310 and the index key to be extracted in the stage wherein maximum value search processing is executed using array element number (221f+1) as the search start node. Here, since the node pointed to by array element number (221f+1) is a leaf node, the index key "101100" is extracted. Then since array element number (221f+1) points to node [1], the array element number (220f) of the node [0] paired with this node [1] is used as the array element number of the next search start node.

Stage (2) in FIG. 14 describes search path stack 310 and the index key to be extracted in the stage wherein maximum value search processing is executed using array element number (221f) as the search start node. Here, since the node pointed to by array element number (221f) is a leaf node, the index key "101011" is extracted. Next since array element number (221f) points to node [0], pop operations and array element number extractions are repeated until an array element number for a node [1] is obtained. Then when the array element number (221b+1) pointed to by node [1] is obtained, the array element number (221b) of the node [0] paired with this node [1] is used as the array element number of the next search start node.

Stage (3) in FIG. 14 describes search path stack 310 and the index key to be extracted in the stage wherein maximum value search processing is executed using array element number (221b) as the search start node. Here, since the node pointed to by array element number (221f+1) is a leaf node, the index key "100011" is extracted. Then since array element number (221f+1) points to node [1], the array element number (220f) of the node [0] paired with this node [1] is used as the array element number of the next search start node.

Stage (4) in FIG. 14 describes search path stack 310 and the index key to be extracted in the stage wherein maximum value search processing is executed using array element number (220f) as the search start node. Here, since the node pointed to by array element number (220f) is a leaf node, the index key "100010" is extracted. Next since array element number (220f) points to node [0], pop operations and array element number extractions are repeated until an array element number for a node [1] is obtained. Then when the array element number (221a+1) pointed to by node [1] is obtained, the array element number (221a) of the node [0] paired with this node [1] is used as the array element number of the next search start node.

Stage (5) in FIG. 14 describes search path stack 310 and the index key to be extracted in the stage wherein maximum value search processing is executed using array element number (220a) as the search start node. Here, since the node pointed to by array element number (221c+1) is a leaf node, the index key "011010" is extracted. Then since array element number (221c+1) points to node [1], the array element number (220c) of the node [0] paired with this node [1] is used as the array element number of the next search start node.

Stage (6) in FIG. 14 describes search path stack 310 and the index key to be extracted in the stage wherein maximum value search processing is executed using array element number (221c) as the search start node. Here, since the node pointed to by array element number (220d+1) is a leaf node, the index key "010011" is extracted. Then since array element number (220d+1) points to node [1], the array element number (220d) of the node [0] paired with this node [1] is used as the array element number of the next search start node.

Stage (7) in FIG. 14 describes search path stack 310 and the index key to be extracted in the stage wherein maximum value search processing is executed using array element number (220d) as the search start node. Here, since the node pointed to by array element number (220d) is a leaf node, the index key "010010" is extracted. Next since array element number (220d) points to node [0], pop operations and array element number extractions are repeated until an array element number for a node [1] is obtained. Then when the array element number (220b+1) pointed to by node [1] is obtained, the array element number (220b) of the node [0] paired with this node [1] is used as the array element number of the next search start node.

Stage (8) in FIG. 14 describes search path stack 310 and the index key to be extracted in the stage wherein maximum value search processing is executed using array element number (220b) as the search start node. Here, since the node pointed to by array element number (220b) is a leaf node, the index key "000111" is extracted. Thereafter pop operations and array element number extractions are repeated until a determination is made that the array element number points to the root and processing is terminated.

Figure 15A:
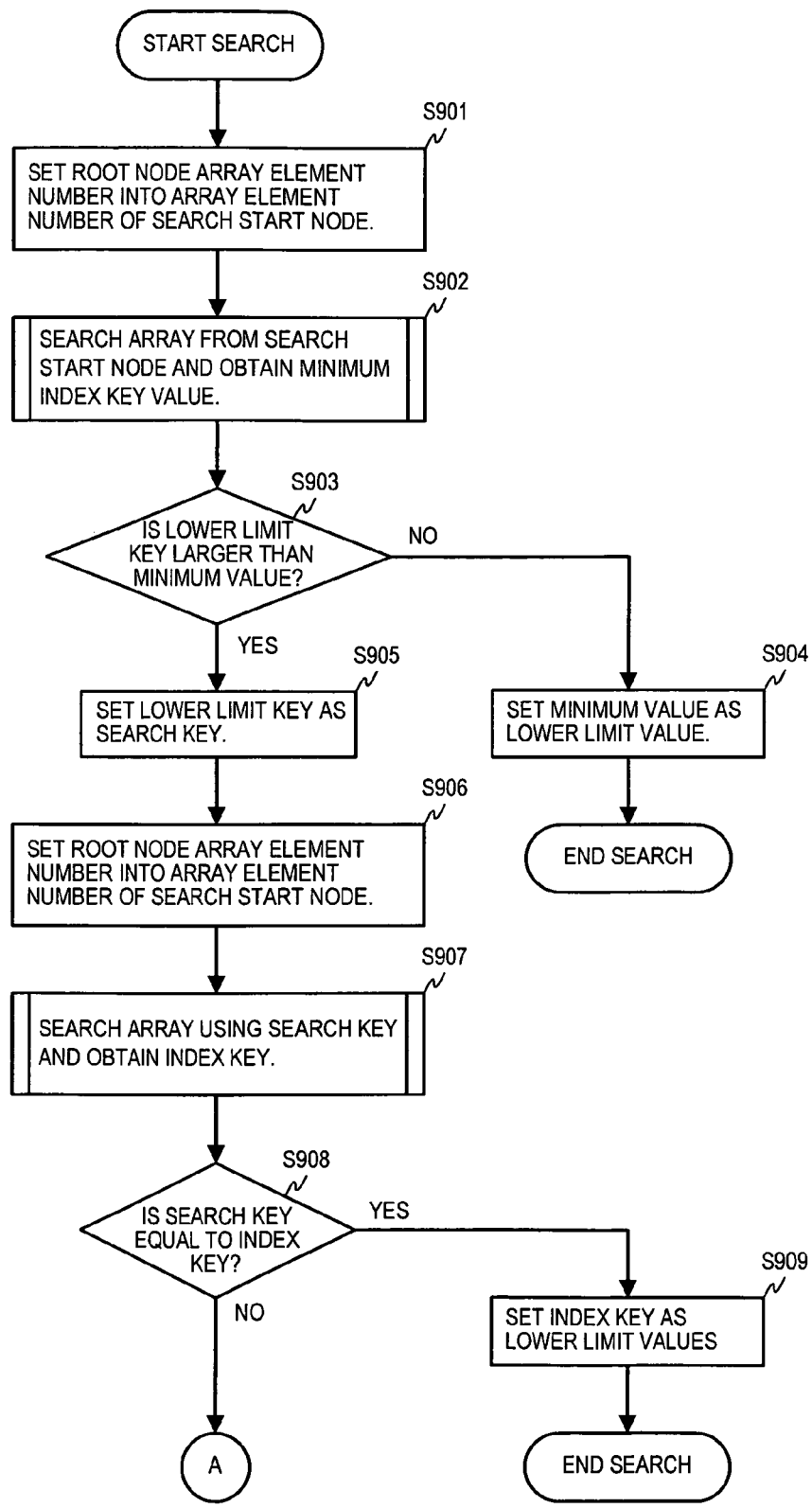
FIG. 15A is an example flowchart of the first stage of requesting the lower limit value for index keys.
Figure 15B:
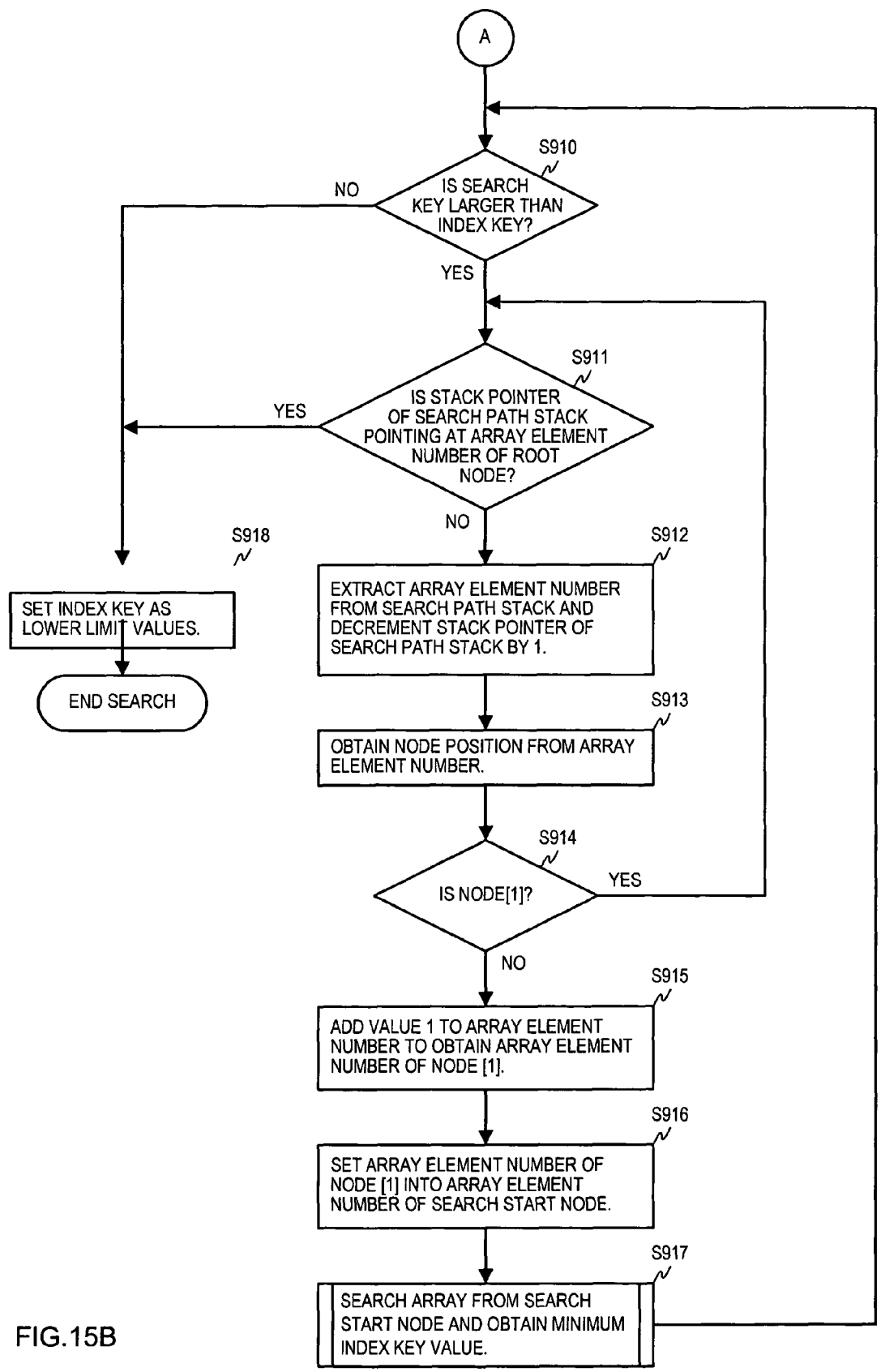
FIG. 15B is an example flowchart of the second stage of requesting the lower limit value for index keys.

FIG. 15A and FIG. 15B are example flowcharts of the processing for determining the lower limit value of an index key stored in the coupled node tree. In this case, the term lower limit value is the minimum value of the index key that is equal to or larger than a specified lower limit key. In the processing for determining the lower limit value described in FIG. 15A and FIG. 15B, when performing a search with regard to a searching range specified by a user or the like, a range in which the index key cannot take on values is not searched, the actual search being performed only over a range of values within which the index key is included. In FIG. 15A and FIG. 15B, the description of the processing for obtaining the specified lower limit key and upper limit key is omitted. The description of the processing for various subsequent applied searches is also omitted in the same manner.

First, at step S901 the array element number of the root node is set into the array element number of the search start node, and at step S902 minimum value search processing is performed to obtain the minimum index key value. Then, at step S903 a comparison is performed between the lower limit key and the minimum value obtained at step S902 to determine whether or not the lower limit key is larger than the minimum value. If the lower limit key is equal to or less than the minimum value, processing proceeds to step S904, at which the minimum value determined at step S902 is set as the lower limit value, and processing is ended.

At step S903 if the determination is made that the lower limit key is larger than the minimum value determined at step S902, processing proceeds to step S905, at which the lower limit key is set as the search key. Then, at step S906, the root node array element number is set into the array element number of the search start node, and at step S907 the index key is searched for using the bit string searching method described by FIG. 5 and FIG. 6. Then, at step S908 a comparison is made between the search key and the index key obtained as a result of the search at step S907 to determine whether or not the values coincide. If the determination is made that the search key and the index key are equal, processing proceeds to step S909, at which the index key obtained by the search is set as the lower limit value, and processing is ended. If the determination is made that the search key and the index key are not equal, processing proceeds to step S910 in FIG. 15B.

At step S910, the size relationship between the search key and the index key is determined. At this point, if the search key is larger than the index key, the index key is smaller than the search key, that is, smaller than the lower limit key, meaning that it is not included in the search range specified by the user or the like. However, if the search key is smaller than the index key, this means that the index key is within the specified search range. That being the case, if the determination is made that the search key is smaller than the index key, processing proceeds to step S918, the index key being set as the lower limit value, and then the processing ending.

At step S910, if the determination is made that the search key is larger than the search key, processing proceeds to step S911. The processing from step S911 to step S917 is processing that extracts the index keys in ascending order, and by the processing from step S911 to step S917 the index keys stored in the coupled node tree are successively extracted, and when an index key having a value that is larger than the lower limit key is obtained, that index key is set as the lower limit value.

Figure 16A:
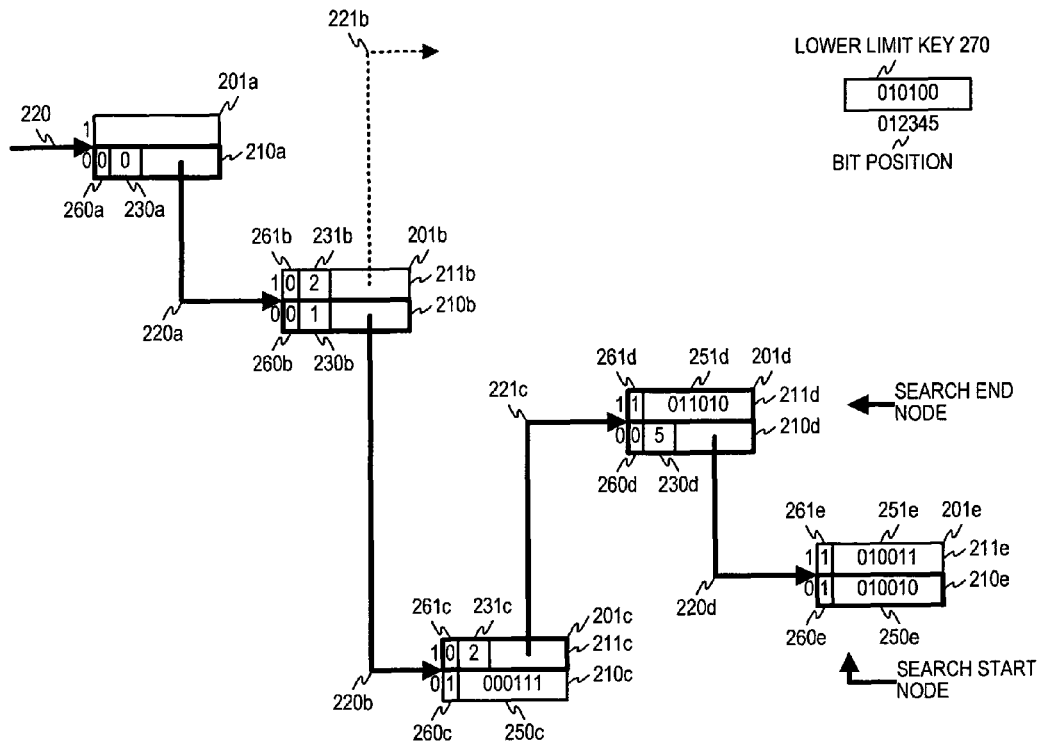
FIG. 16 is a drawing describing exemplarily the processing for requesting the lower limit value for index keys.
Figure 16B:
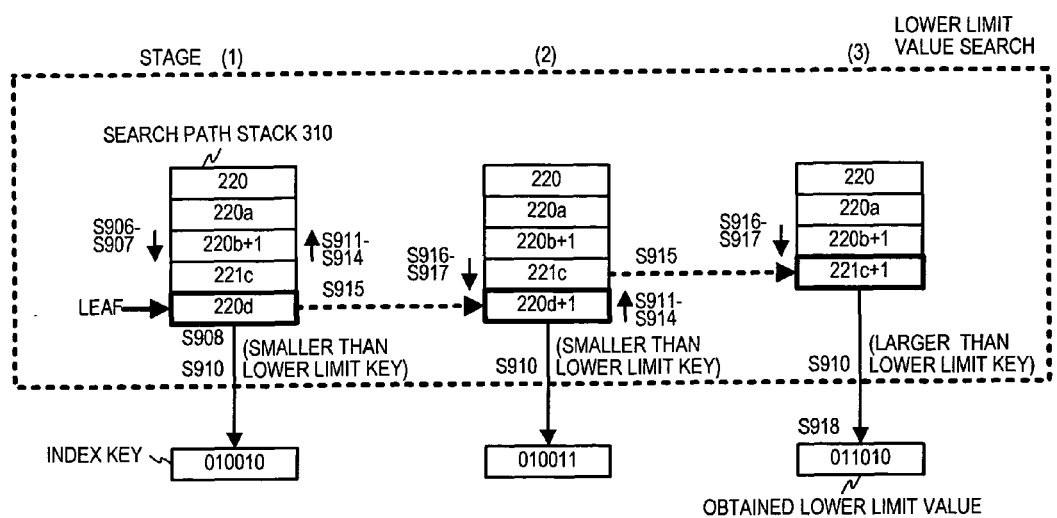

FIG. 16 is a drawing that describes exemplarily the processing for obtaining a lower limit value for index keys as described in the flowcharts of FIG. 15A and FIG. 15B. Of these, FIG. 16A describes the coupled node tree and the search key save area 270 and FIG. 16B describes the search path stack 310. As described in FIG. 16A, "010110" is set in search key save area 270 as the lower limit key. Also, FIG. 16A abstracts and delineates the parts of the coupled node tree described in FIG. 3 that relate to a search for a lower limit value.

As was explained when referring to FIG. 15A and FIG. 15B, in the processing to obtain the lower limit value for index keys, the minimum value of the index keys is obtained by using the root node as the search start node. In the example described in FIG. 16A, the index key "000111" contained in the node with the array element number 220b is obtained as the minimum value. Since, when the obtained minimum value is compared with the lower limit key "010110", the lower limit key is larger, and when the lower limit key is used as the search key and the index key in the coupled node tree is searched for, the index key obtained is the index key "010010" contained in the node with the array element number 220d. Stage (1) in FIG. 16B describes the status of the search path stack 310 at the stage wherein the index key contained in the node with the array element number 220d is obtained, in other words, at the stage wherein the processing up to step S907 is executed.

Since the index key "010010" contained in the node with array element number 220d is smaller than the lower limit key "010100" and it is not included in the search range, a search is done for an index key with the next larger value and the index key "010011" contained in the node with the array element number (220d+1) is obtained. Stage (2) in FIG. 16B describes the status of the search path stack 310 at the stage wherein the index key "010011" contained in the node with the array element number (220d+1) is obtained by executing the process from step S911 to step S917.

The index key "010011" contained in the node with array element number (220d+1) is also still smaller than the lower limit key "010100" and it is not included in the search range. Here, an index key is again extracted in ascending order and the obtained index key is compared with the lower limit key. Since the index key "011010" next obtained from the coupled node tree described in FIG. 16A is larger than the lower limit key "010100", the index key contained in the node with the array element number (221c+1) is set as the lower limit value and processing is terminated. Stage (3) in FIG. 16B describes the status of the search path stack 310 at the stage wherein the index key "011010" contained in the node with the array element number (221c+1) is obtained.

Figure 17A:
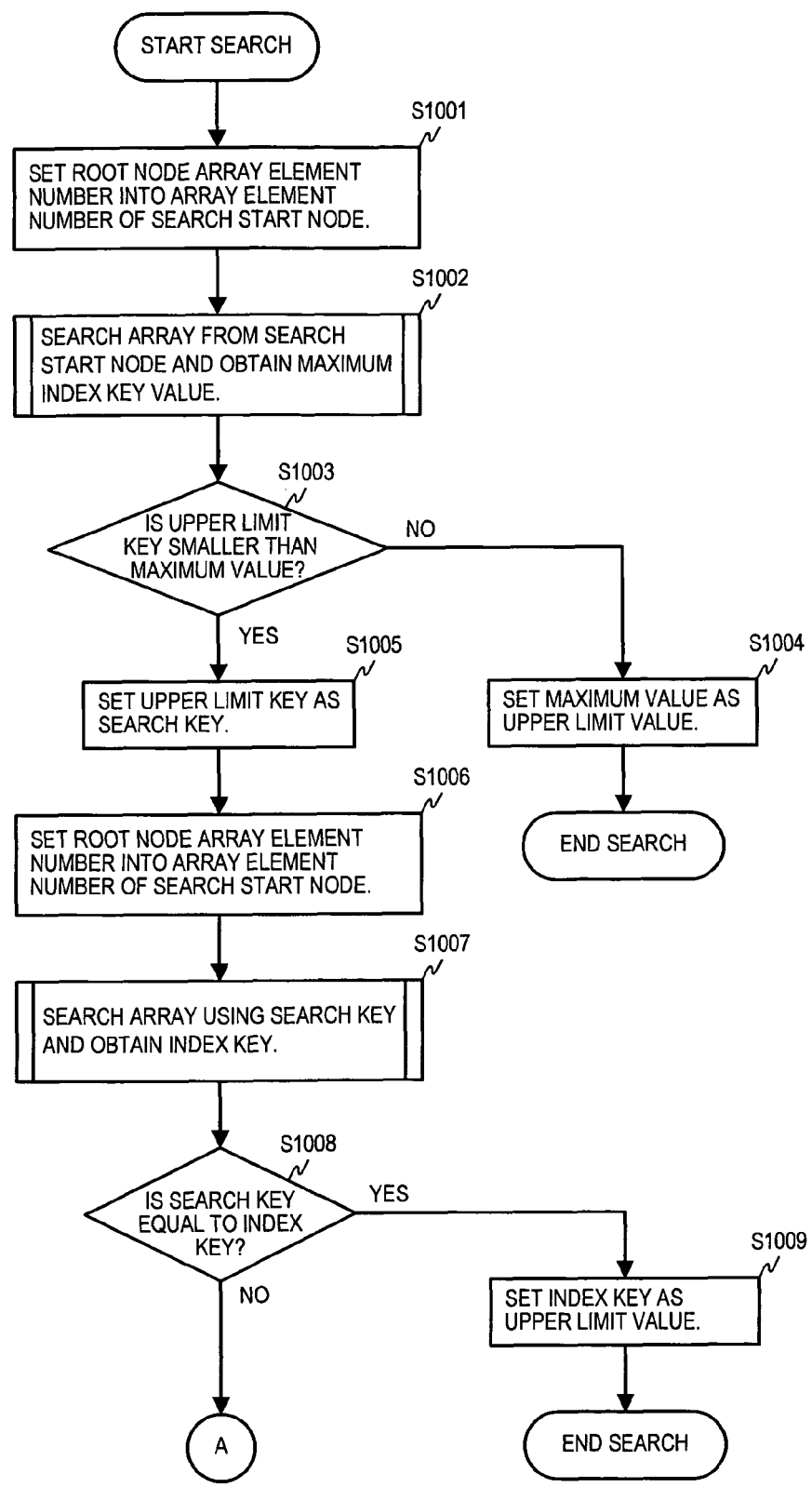
FIG. 17A is an example flowchart of the first stage of requesting the upper limit value for index keys.
Figure 17B:
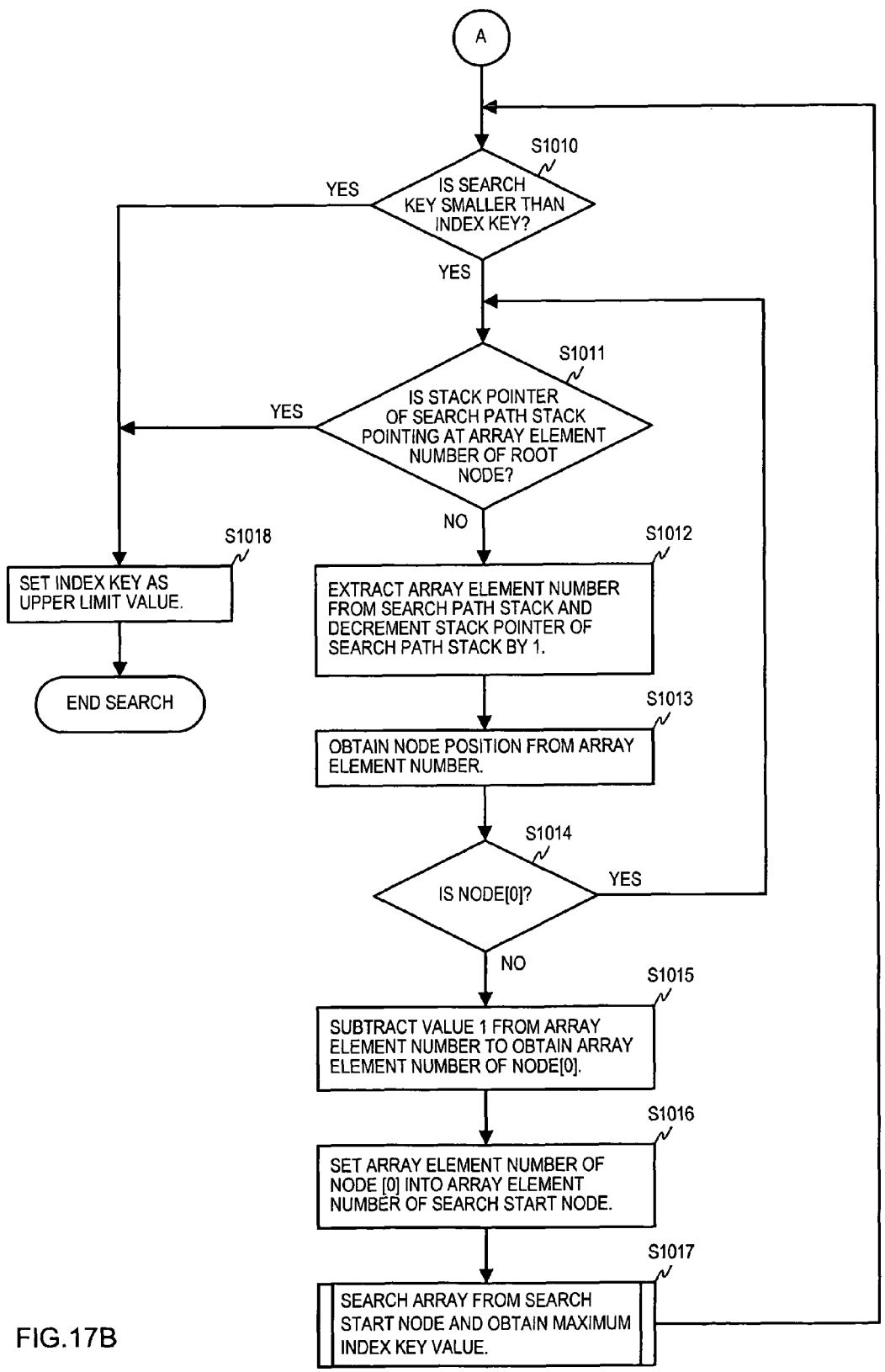
FIG. 17B is an example flowchart of the second stage of requesting the upper limit value for index keys.

FIG. 17A and FIG. 17B are example flowcharts of the processing for determining the upper limit value of the index keys stored in the coupled node tree. The term upper limit value used herein is the maximum value of the index keys that is less than or equal to the specified upper limit key. Similar to the processing for determining the lower limit value, in the processing for determining the upper limit value described in FIG. 17A and FIG. 17B, when performing a search with regard to a searching range specified by a user, a range in which the index key cannot take on values is not searched, the actual search being performed only over a range of values within which the index key is included.

First, as step S1001, processing to search for the root node as the search start node is similar to processing for determining the lower limit value of the index key, and processing of step S1002 and thereafter corresponds to processing of the above-noted step S902 and thereafter.

That is, in the processing to determine the lower limit value described using FIG. 15A and FIG. 15B, the processing starting at step S902 searches for the lower limit key specified by the user or the like and an index key taking a value that is equal to or larger than the lower limit key and that is also closest to the lower limit key, of the search key specified by the user or the like and the index keys included in the coupled node tree. In contrast, in the processing for determining the upper limit value described in FIG. 17A and FIG. 17B, the processing starting at step S1002 searches for the index key that takes a value that is equal to or less than the upper limit key specified by the user or the like and is also the closest to the upper limit key.

If a comparison is made with the processing described in FIG. 15A and FIG. 15B, the procedure up until the determination of the lower limit value and the upper limit value are basically the same. The differences lie in the determination of size relationship when a comparison is made between the specified key (lower limit key/upper limit key) and the index key (steps 903 and S910 or steps S1003 and S1010), the determination of the index key minimum value/maximum value when searching the coupled node tree using the specified key as a search key (step S907 or step S11007), and the sequence of obtaining the index keys to be respectively ascending or descending sequence (processing starting at step S911 or step S1011), the results of these three processes being reversed, The specific processing performed starting at step S1002 is described below.

When the maximum index key value included in the coupled node tree is determined at step S1002, at step S1003 a comparison is performed of the maximum value determined at step S1002 and the upper limit key, to determine whether or not the upper limit key is larger than the maximum value. If the upper limit key is equal to or larger than the maximum value of the index key, processing proceeds to step S1004, at which the maximum value determined at step S11002 is set as the upper limit value, and processing is ended.

In the case in which the upper limit key is less than the maximum value, processing proceeds to step S11005, at which the upper limit key is set as the search key. Then, at step S1006, the root node array element number is set as the array element number of the search start node, and at step S1007 a search for the search key is performed, after which processing proceeds to step S1008.

At step S1008, a determination is made as to whether or not the search key and index key obtained at step S1007 are equal. At step S1008, if the determination is made that these values are equal, processing proceeds to step S11009, at which the index key obtained at step S1007 is set as the upper limit value, at which point processing ends. At step S1008 if the determination is "not equal," processing proceeds to step S1010 of FIG. 17B.

At step S1010, a determination is made of the size relationship between the search key and the index key. If the search key is smaller than the index key, the index key is smaller than the upper limit key, meaning that it is not included in the search range specified by a user or the like. If, however, the search key is larger than the index key, this means that the index key is included within the range specified by the user or the like. This being the case, if the determination is made that the search key is larger than the index key, processing proceeds to step S1018, the index key being set as the lower limit value, and the processing ending.

At step S1010, if the determination is made that the search key is smaller than the index key, processing proceeds to step S1011. The processing starting at step S1011 is processing that extracts the index keys in descending order, the processing from step S1010 to step S1017 being repeated until the determination is made that the search key is larger than the index key.

Figure 18A:
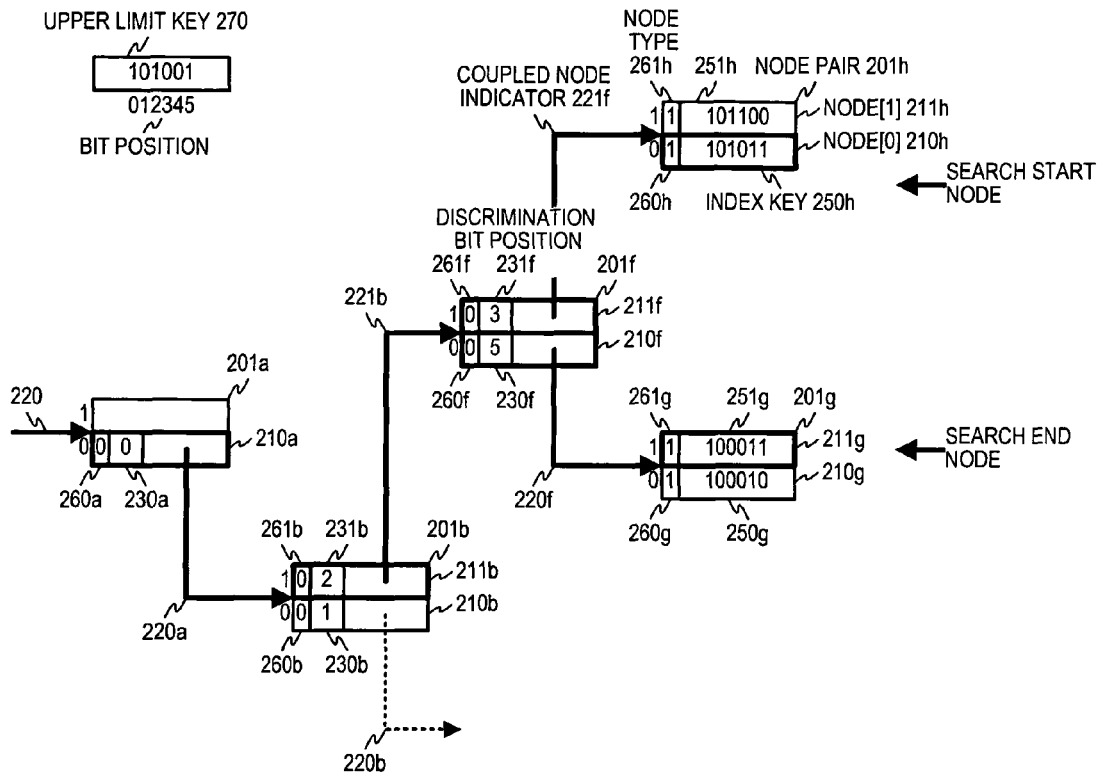
FIG. 18 is a drawing describing exemplarily the processing for requesting the upper limit value for index keys.
Figure 18B:
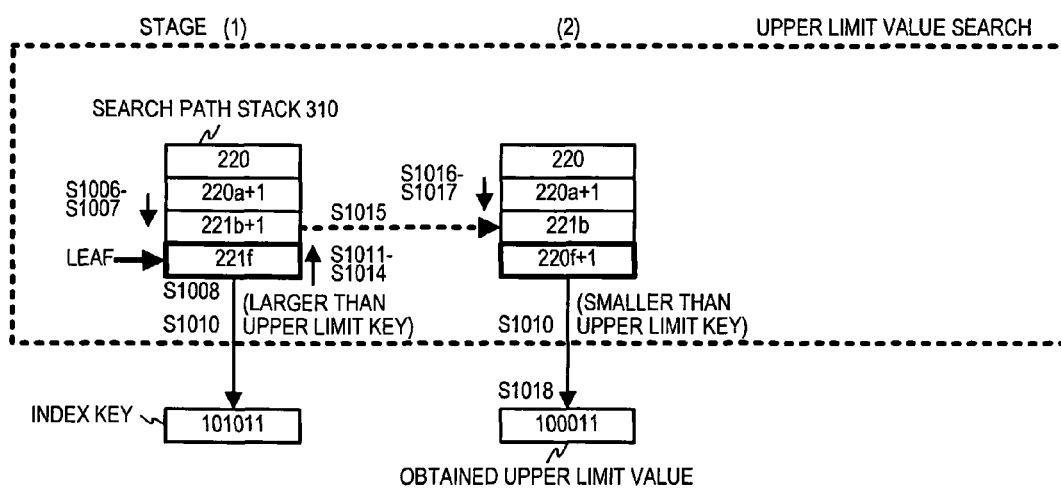

FIG. 18 is a drawing describing exemplarily the processing for obtaining an upper limit value for index keys, as described in the flowcharts of FIG. 17A and FIG. 17B. Of these two drawings, FIG. 18A describes the search key save area 270 and a coupled node tree and FIG. 18B describes the search path stack 310. As described in FIG. 18A, "101001" is set in the search key save area 270 as the upper limit key. FIG. 18A abstracts and describes only those parts of the coupled node tree described in FIG. 3 that are related to a search for an upper limit value.

As was explained by referencing FIG. 17A and FIG. 17B, in the processing to obtain the upper limit value of the index keys, first the maximum value is obtained for the root node of array element number 220. Following the example described in FIG. 18A, the index key "101100" contained in the node with array element number (221f+1) is obtained as the maximum value. But when a value comparison is made with the upper limit key "101001", since the upper limit key is smaller, the coupled node tree is again searched using the upper limit key as the search key. As a result of the search the index key "101011" contained in the node with array element number (221f) is obtained. Stage (1) of FIG. 18B describes the status of search path stack 310 at the stage wherein the index key "101011" contained in the node with array element number (221f) is obtained in the processing of step S1007.

Since the index key "101011" contained in the node with array element number (221f) is larger than the upper limit key, the next largest index keys is searched for. As a result of the search the index key "100011" contained in the node with array element number (221f+1) is obtained. Here, the processing to find the node with array element number (221f+1) corresponds to the processing from step S1011 to step S1017 in the processing described in FIG. 17B. Stage (2) of FIG. 18B describes the status of search path stack 310 at the stage wherein the processing is executed up to step S1017. Since the index key "100011" contained in the node with array element number (221f+1) is smaller than the upper limit key, processing proceeds from step S1010 to step S1018. From this, if the upper limit value is obtained using "101001" as the upper limit key in the coupled node tree described in FIG. 18A, the index key "100011" contained in the node with array element number (220f+1) is set as the upper limit value.

Also, in the above search process determining an upper limit value and a lower limit value, the search was exemplified using both and upper limit key and a lower limit key of which value are within the scope of a coupled node tree, and of course, a search is possible using an upper limit key or a lower limit key of which value are without the scope of a coupled node tree.

By combining a number of the above search applications, the search processing described below also becomes possible.

Figure 19A:
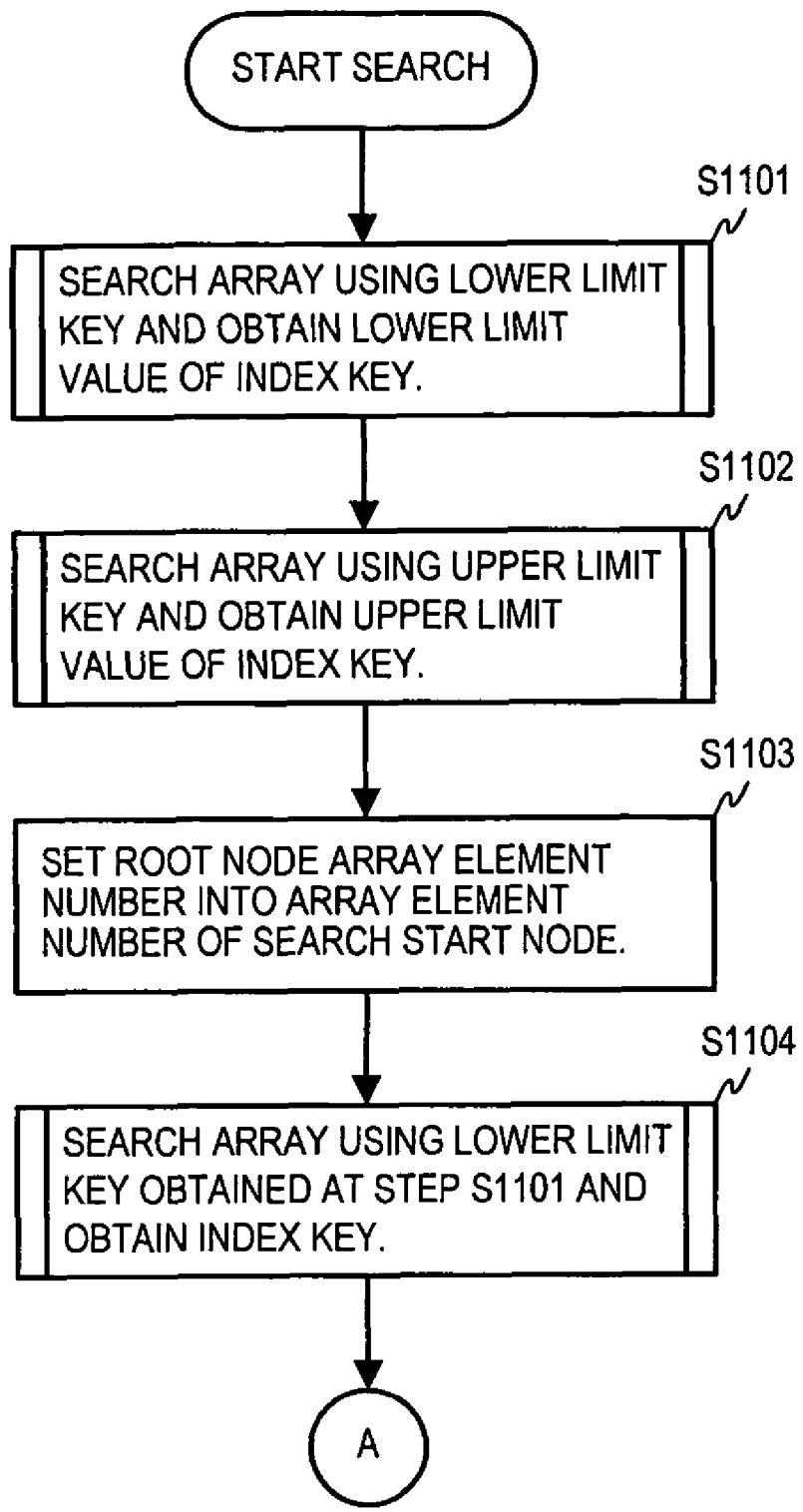
FIG. 19A is an example flowchart of the first stage of processing a search for index keys in ascending order with the search range specified.
Figure 19B:
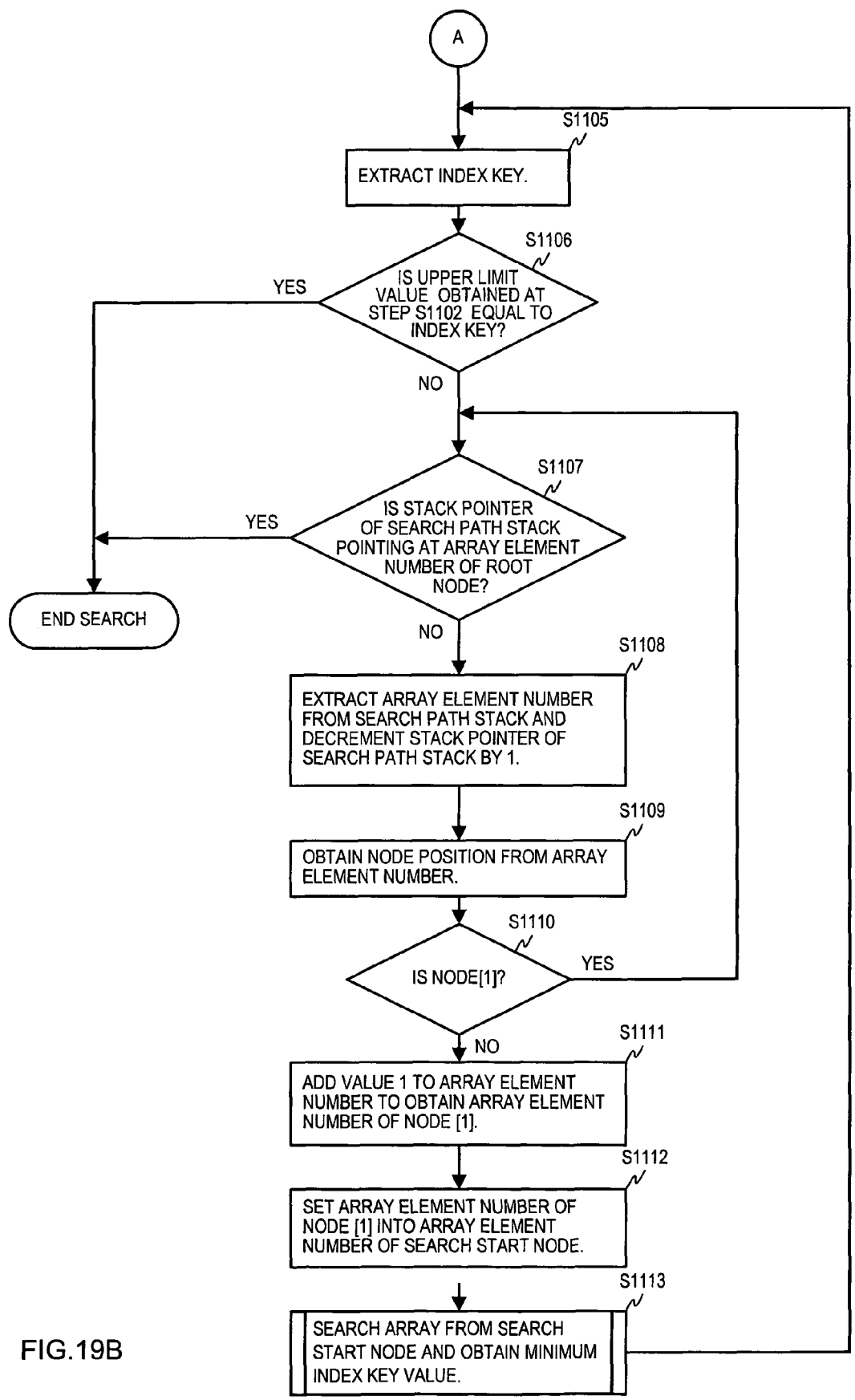
FIG. 19B is an example flowchart of the second stage of processing a search for index keys in ascending order with the search range specified.

FIG. 19A and FIG. 19B are example flowcharts of the search processing, in ascending order with a search range specified, for index keys stored in a coupled node tree. Referencing FIG. 19A and FIG. 19B, the range search processing in ascending order is described given that the upper limit and lower limit is specified by a user or others.

First, in step S1101, the coupled node tree is searched using the lower limit key and the lower limit value of the index keys is obtained. The processing in step S1101 is the processing explained referencing FIG. 15A and FIG. 15B.

Next in step S102, the coupled node tree is searched using the upper limit key and the upper limit value of the index keys is obtained. The processing in step S1102 is the processing explained referencing FIG. 17A and FIG. 17B.

Then in step S103, the array element number of the root node is set in the array element number of the search start node. In step S104, the coupled node tree is searched using the above lower limit value, and an index key is obtained. The process to search the coupled node tree is the process explained referencing FIG. 5. In this step S1104, after the lower limit value and upper limit value are both obtained previously in step S1101 and step S1102, searching is done using this lower limit value. For this reason, the index key obtained as a result of the search within a range from the specified lower limit key to the upper limit key is the minimum value of the index keys actually contained in the range.

In step S1105, the index key is extracted and after that the processing to extract index keys in ascending order is executed. The process to extract index keys is ascending order is repeated until in step S106 the index key reaches the upper limit value or in step S107 the pointer points to the array element number of the root node.

Figure 20A:
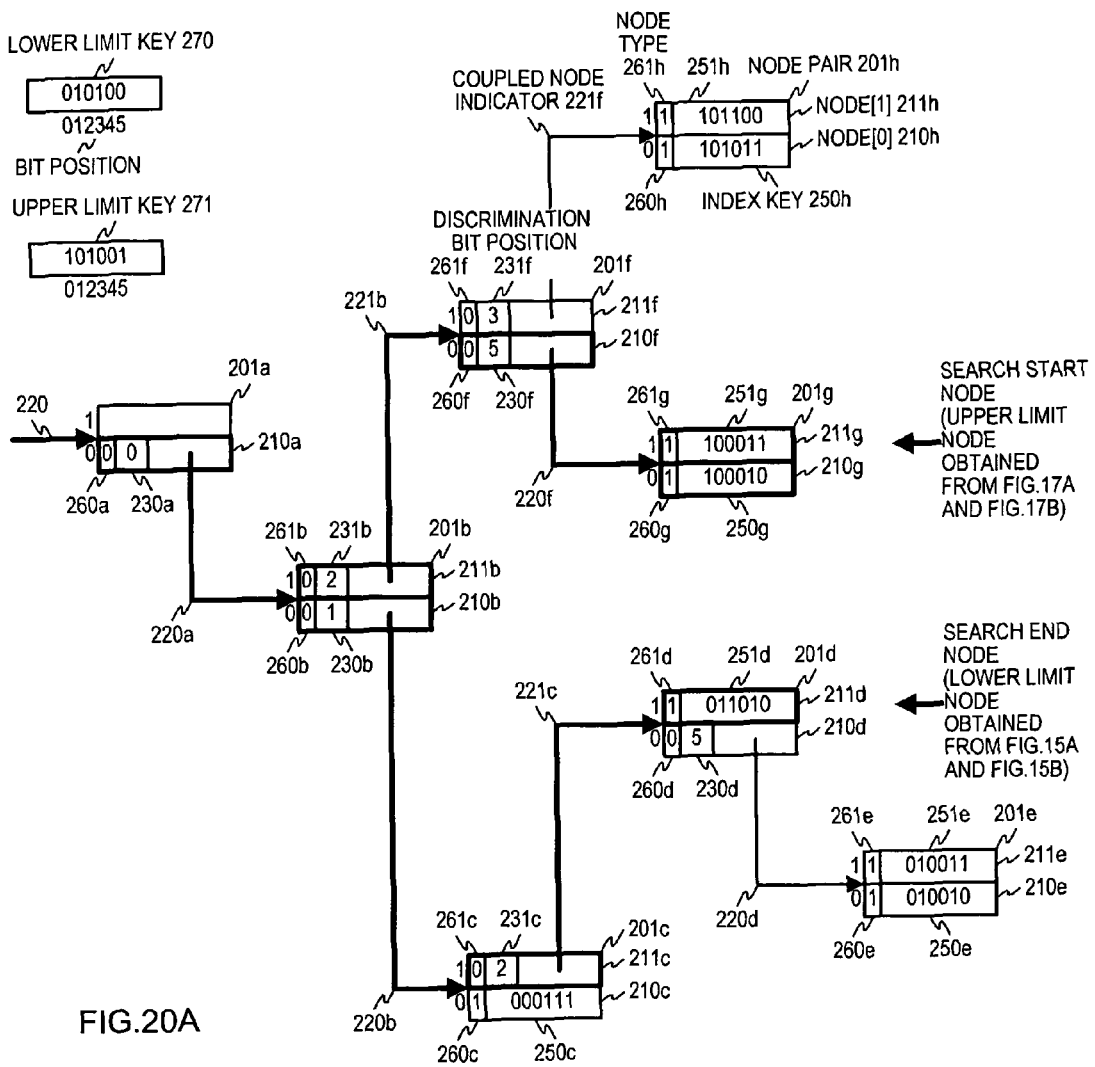
FIG. 20 is a drawing describing exemplarily the processing of a search for index keys in ascending order with the search range specified.
Figure 20B:
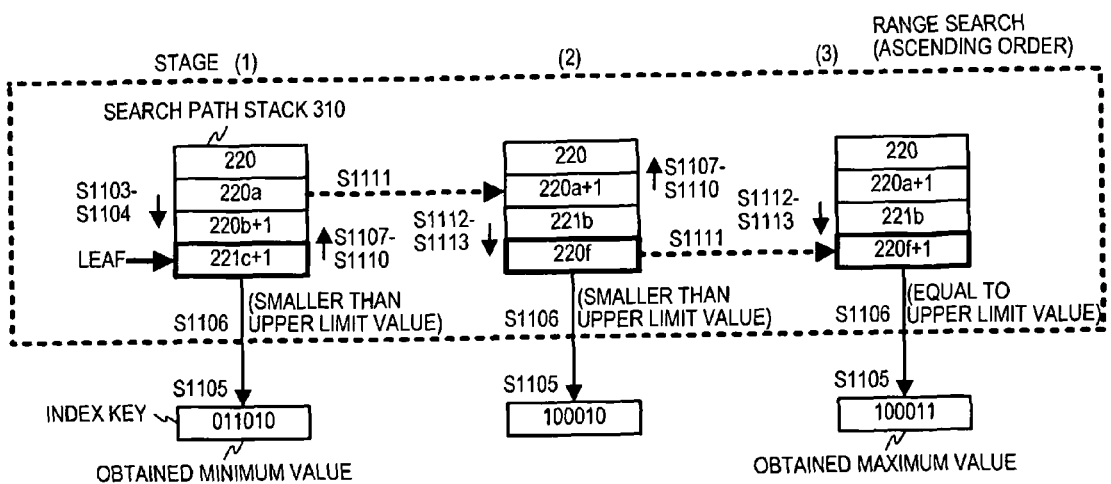

FIG. 20 is a drawing describing exemplarily the search processing, in ascending order with a search range specified, for index keys stored in a coupled node tree, and FIG. 20A describes a coupled node tree, and FIG. 20B describes search path stack 310. In the explanation below, it is assumed that the lower limit key "010100" is stored in the first search key save area 270 and the upper limit key "101001" is stored in the second search key save area 271.

First, by executing the processing of step S1101 and step S1102, the lower limit value and the upper limit value are determined to be the index key "011010" of the node with array element number (221c+1) and the index key "100011" of the node with array element number (221f+1) respectively. When the node with array element number (221c+1) in which is stored the lower limit value is used as the search start node and index keys are obtained in ascending order, the nodes with the array element numbers (221c+1), 220f, and 220f+1 are successively extracted from the tree described in FIG. 20A.

Stages (1), (2), and (3) of FIG. 20B describe the status of the search path stack 310 at each stage of successively acquiring the index keys of these nodes in ascending order. Stage (1) of FIG. 20B describes the index key extracted and the status of search path stack 310 at the stage wherein the above minimum value search processing was executed within the search range using the array element number 220 of the root node as the array element number of the search start node, and stages (2) and (3) describe the index key extracted and the status of search path stack 310 at the stage wherein the above minimum value search processing was executed within the search range using the array element numbers (220a+1) and (220f+1) as the array element number of the search start node respectively. Here, since the processing to be executed is that of the previously cited ascending order search processing executed in the range from the lower limit value to the upper limit value, the details will be omitted.

In the example described in FIG. 20, the index key determined in step S1106 and the upper limit value are compared but since in the comparison of the index key "100011" of the node with array element number (220*f*+1) with the upper limit value they are found to be equal, after extracting the index key "100011" of the node with array element number (220*f*+1) in step S1105, the search in ascending order is terminated.

Figure 21A:
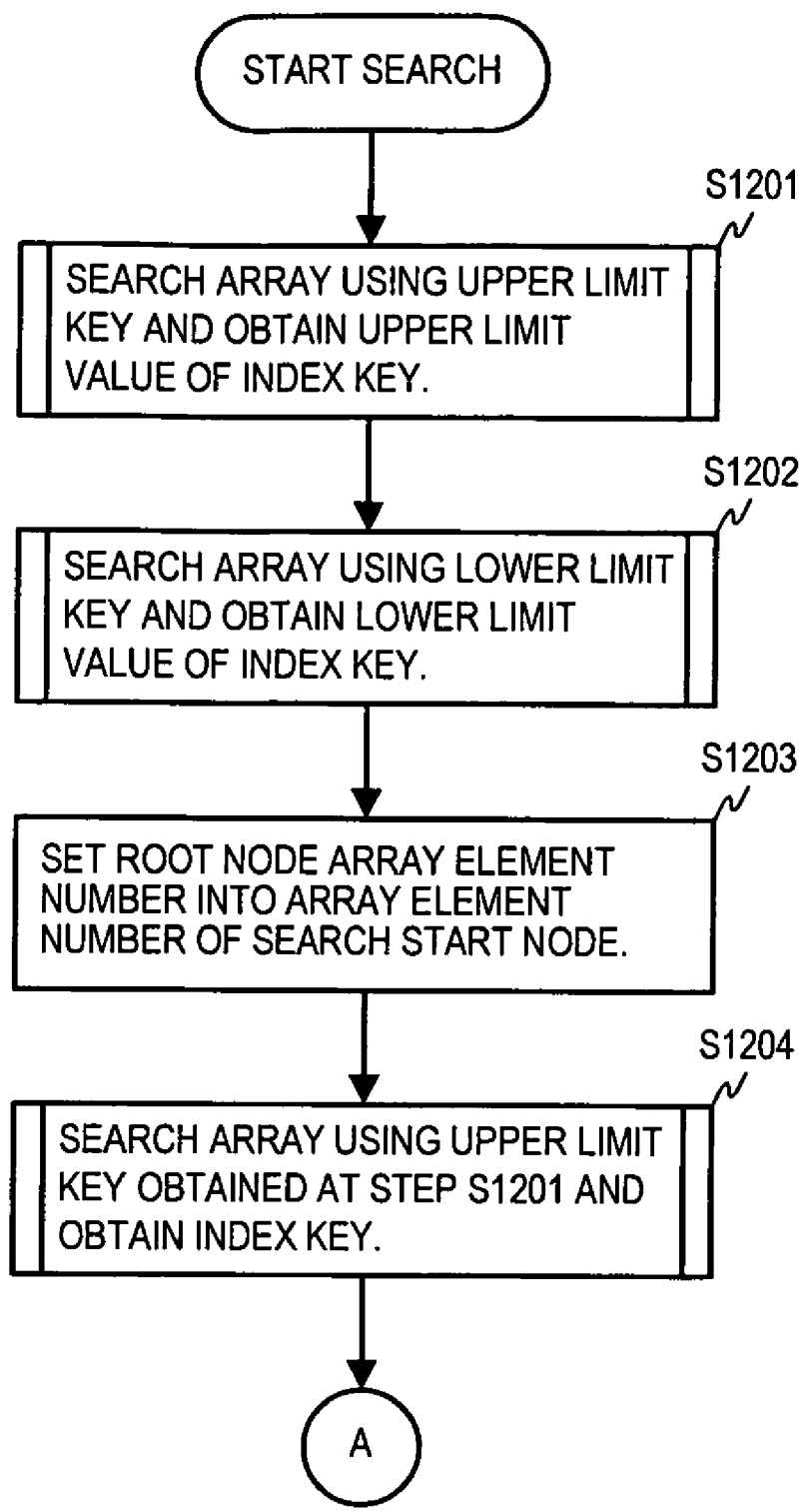
FIG. 21A is an example flowchart of the first stage of processing a search for index keys in descending order with the search range specified.
Figure 21B:
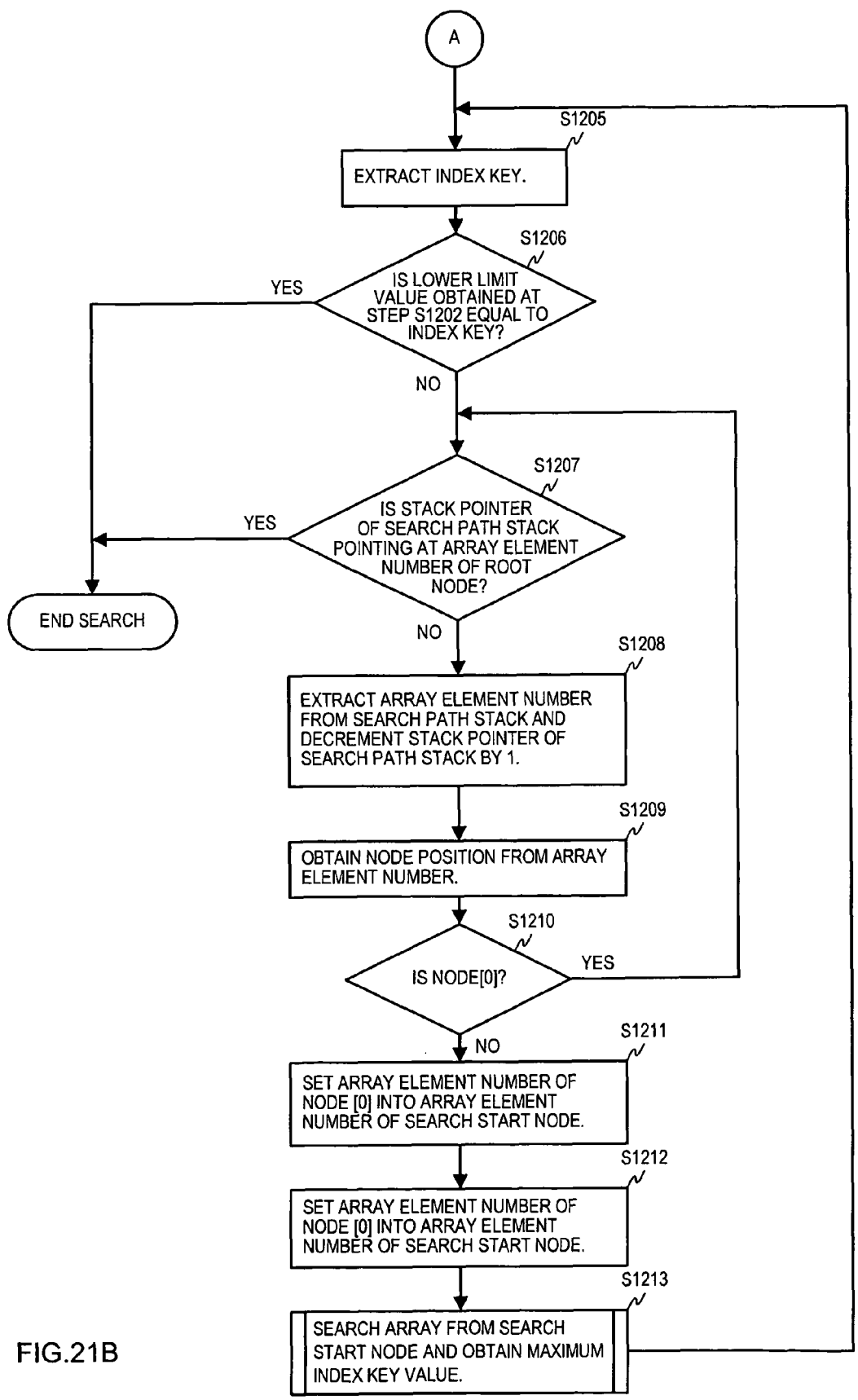
FIG. 21B is an example flowchart of the second stage of processing a search for index keys in descending order with the search range specified.

FIG. 21A and FIG. 21B are example flowcharts of the describing the search processing, in descending order with a search range specified, for index keys stored in a coupled node tree. Referencing FIG. 21A and FIG. 21B, the range search processing in descending order is described given that the upper limit and lower limit is specified by a user or others, focusing on the points differing from the search processing in ascending order described above.

The processing, based on the specified upper limit key and lower limit key, to acquire the upper limit value and lower limit value of the index keys in step S1201 and step S1202 is the same as the processing of step 1102 and step 1101 in FIG. 19A, respectively.

In step S1203, the array element number of the root node is set as the array element number of the search start node, the same as in step S1103 of FIG. 19A, and in step S1204, search processing is executed on the coupled node tree using the obtained upper limit value as the search key and the index key is acquired. In the processing from step S1205 and on, index keys included in the range from the upper limit value to the lower limit value are successively extracted in descending order and in step S1206 if a determination that the extracted index is the same as the lower limit or in step S1207 if a determination is made that the pointer in search path stack 310 points to the array element number of the root node, the process to extract the index keys in descending order is terminated.

Figure 22A:
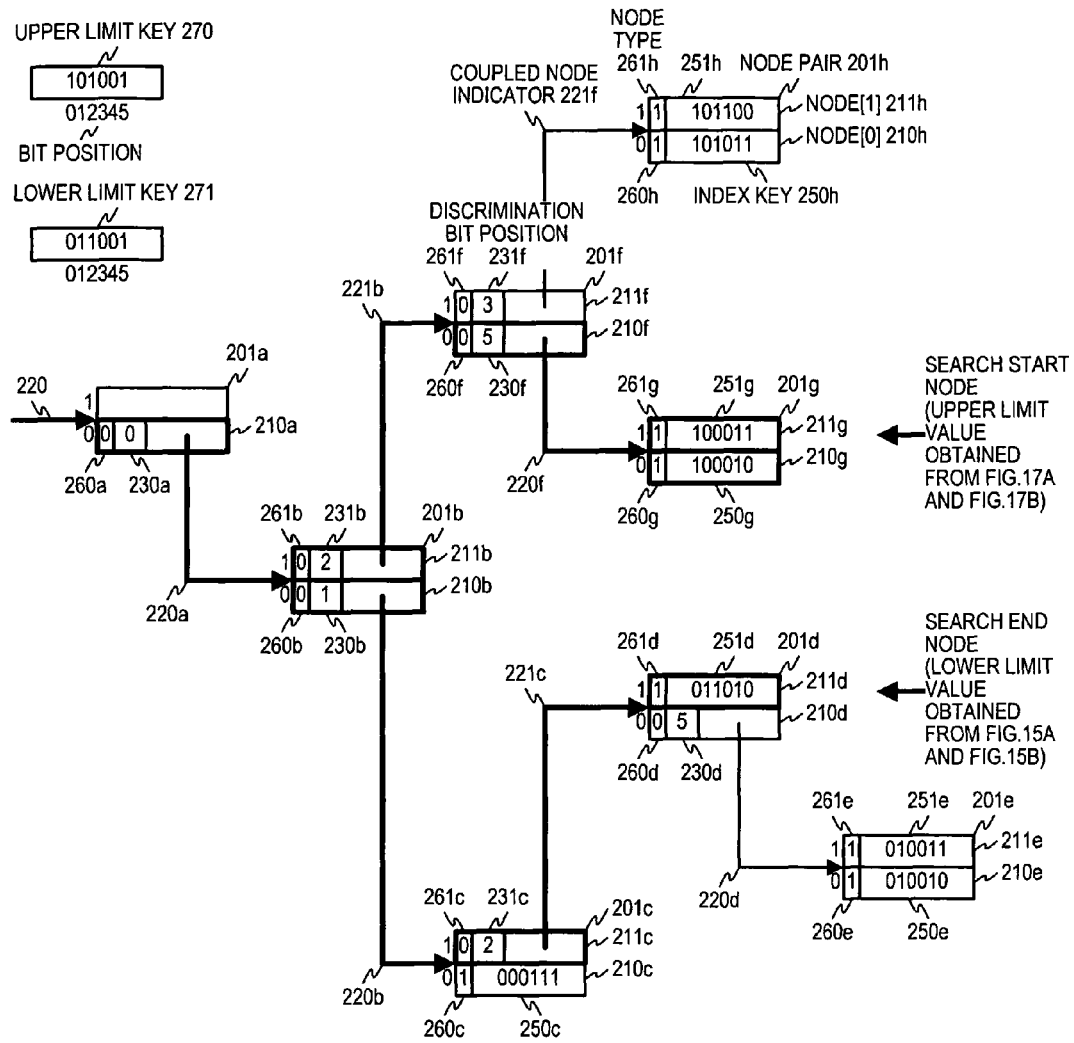
FIG. 22 is a drawing describing exemplarily the processing of a search for index keys in descending order with the search range specified.
Figure 22B:
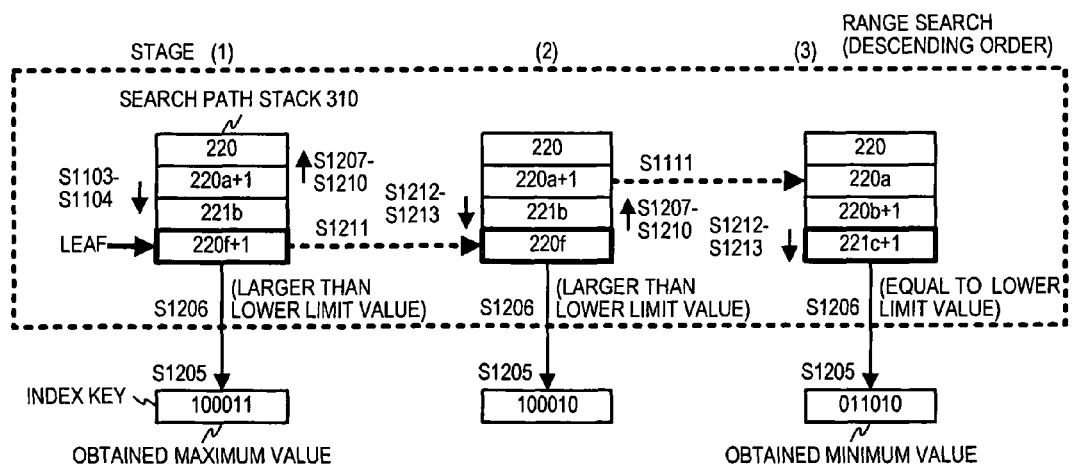

FIG. 22 is a drawing describing exemplarily the processing to search for index keys in descending order, stored in a coupled node tree, within a specified search range, and FIG. 22A describes the coupled node tree and FIG. 22B describes the search path stack 310. In the explanation below, it is assumed that "101001" is set as the upper limit key in the first search key save area 270 and "011001" is set as the lower limit key in the second search key save area 271.

First, by executing the processing in step S1201 and step S1202 with the upper limit value and the lower limit value, the index key "100011" of the node with array element number (220*f*) and the index key "011010" of the node with the array element number (221*c*+1) is obtained respectively. Next, using as the search start node the node with the array element number (220*f*+1) stored in the upper limit value, when the index keys are successively obtained in descending order, following the node with array element number (220*f*+1) the nodes with array element numbers 220*f* and (221*c*+1) are successively extracted.

Stages (1), (2), and (3) of FIG. 22B describe the status of search path stack 310 at each stage of successively acquiring the index keys of these nodes in descending order. Stages (1), (2), and (3) of FIG. 22B describe the status of the search path stack 310 at each stage of successively acquiring the index keys of these nodes in ascending order.

Stage (1) of FIG. 22B describes the index key extracted and the status of search path stack 310 at the stage wherein the above maximum value search processing was executed within the search range using the array element number 220 of the root node as the array element number of the search start node, and stages (2) and (3) describe the index key extracted and the status of search path stack 310 at the stage wherein the above maximum value search processing was executed within the search range using the array element numbers (220*f*) and (220*a*) as the array element number of the search start node respectively. Since the processing to be executed here is that of the previously cited descending order search processing executed in the range from the upper limit value to the lower limit value, the details will be omitted.

In the example described in FIG. 22, the index key determined in step S1206 and the upper limit value are compared but since in the comparison of the index key "011010" of the node with array element number (221*c*+1) with the upper limit value they are found to be equal, after extracting the index key "011010" of this node in step S1205, the search in descending order is terminated.

Search processing in ascending order or descending order with a search range with a fixed upper limit value and lower limit value can also be applied to the process of extracting index keys that have a partial match with a search key. Below, as an example of partial match searches, prefix match search processing is described.

Figure 23:
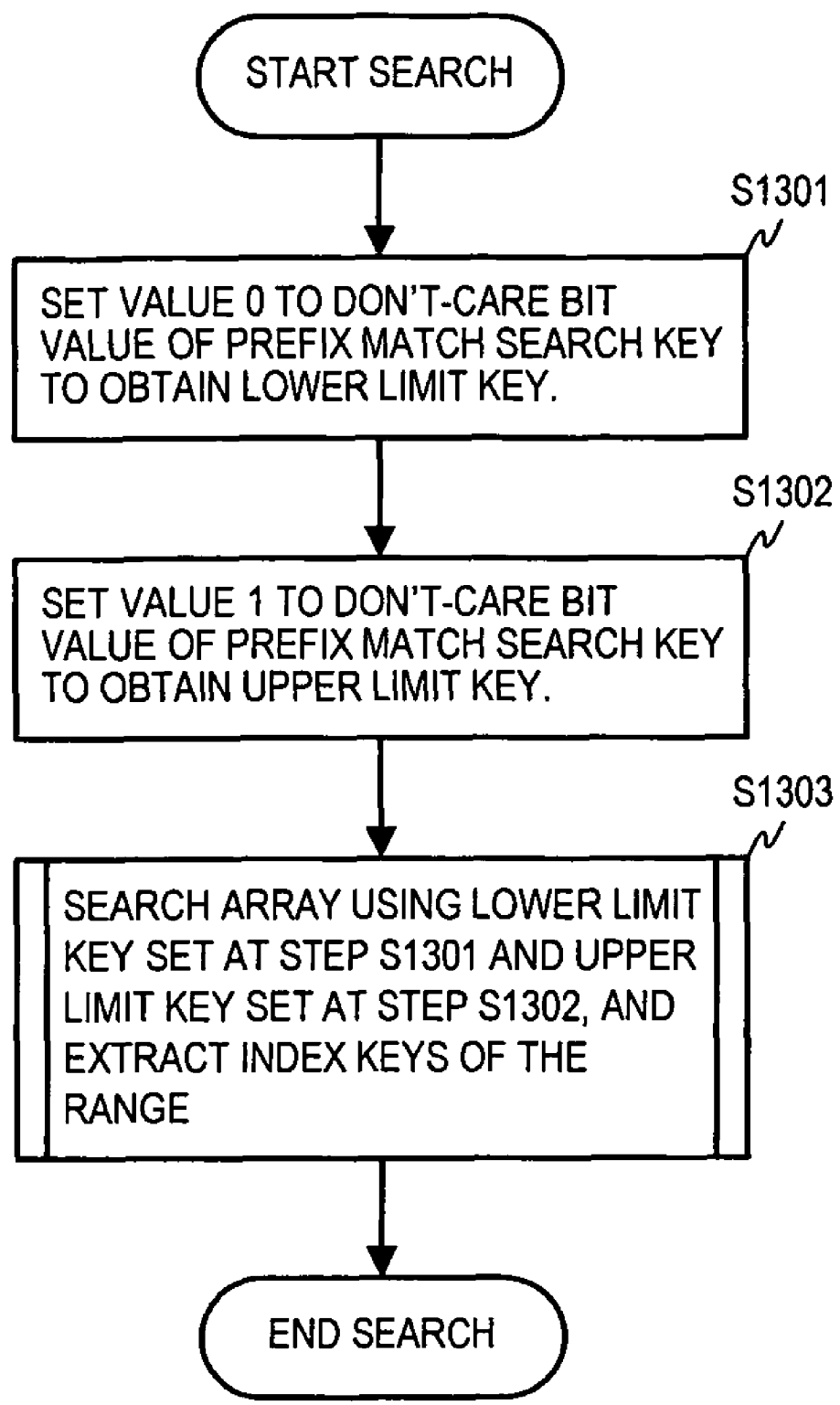
FIG. 23 is an example flowchart of the processing when searching for the prefix match for index key values stored in a coupled node tree.

FIG. 23 is an example flowchart of prefix match search processing for index keys stored in a coupled node tree. Referencing FIG. 23, the processing to extract all index keys that match up to bit position <n> (n being an integer 0 or larger) from the index keys stored in a coupled node tree is described.

First, in step S1301, the lower limit key is acquired. The values of each bit in the lower limit key are set to a value matching, in sequence, each bit of the search key from the front (bit position <0>) to bit position <n> and all the bits in the bit string from bit position <n+1> are set to "0".

Next, in step S1302, the upper limit key is acquired. The values of each bit in the upper limit key are set to a value matching, in sequence, each bit of the search key from the front (bit position <0>) to bit position <n> and all the bits in the bit string from bit position <n+1> are set to "1".

Then, in step S1303, using the lower limit key and upper limit key set in the previous steps, the array is searched, the index keys are extracted, and processing is terminated. The search processing here is just like the range search that explained previously using FIG. 19A and FIG. 19B.

Figure 24A:
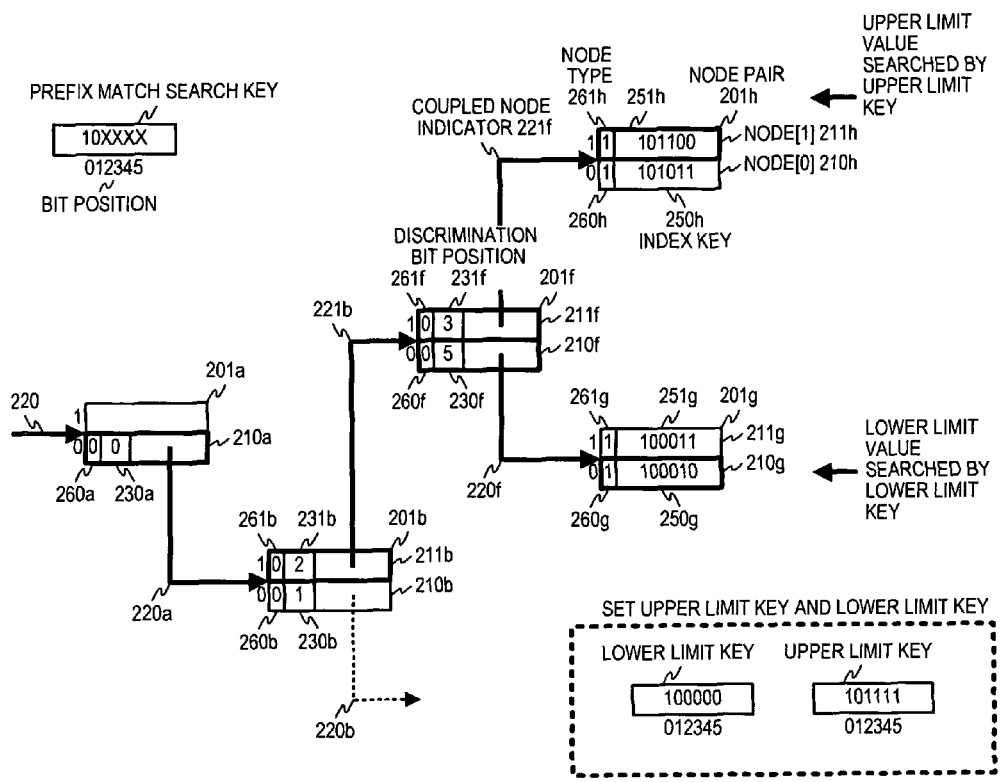
FIG. 24 is a drawing describing exemplarily the processing when searching for the prefixed match for index key values.
Figure 24B:
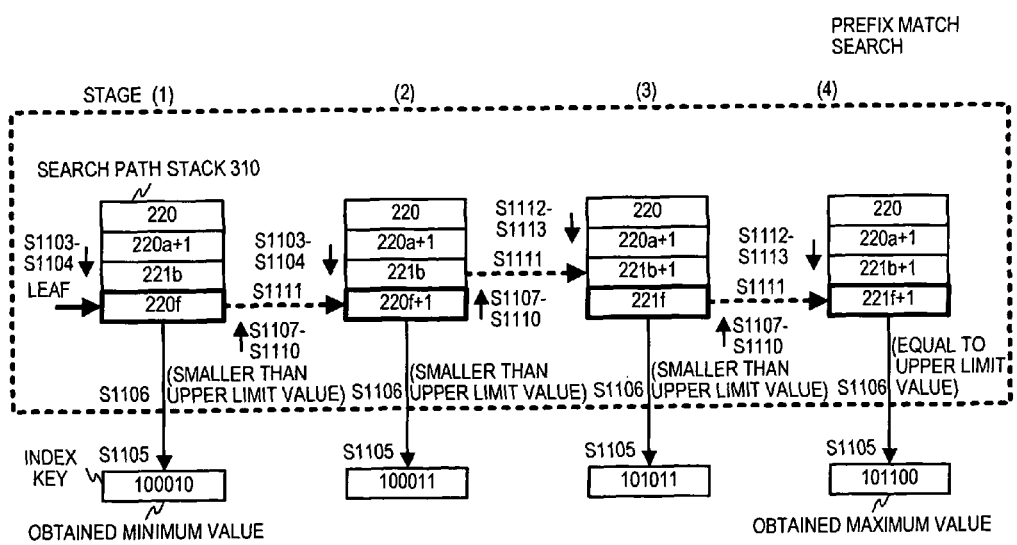

FIG. 24 is a drawing explaining the prefix match search processing described in the flowchart of FIG. 23, wherein FIG. 24A describes a coupled node tree and FIG. 24B describes the search path stack 310. As described in FIG. 24A the prefix match key that is the search key for the prefix match search is assumed to be "10xxxx" (where x is don't-care bit value). In other words, it is assumed that the user or other has specified "10" as the bit string for the prefix match search.

Just as was explained above, if the prefix match key is "10xxxx", the lower limit key and upper limit key are set in the set area of the drawing as "100000" and "101111", respectively. When the lower limit value and upper limit value are set as the search range for index keys using this lower limit key and upper limit key, the index key "100010" of node 210*g* is set as the lower limit value and the index key "101100" of node 211*h* is set as the upper limit value, respectively. For example, as described in FIG. 19A and FIG. 19B, when the index keys are successively extracted in ascending order for the index keys within the search range, since, in a coupled node tree, as was described earlier, the index keys are stored sorted, the desired prefix matching index keys can be obtained. The status of search path stack 310 when the processing to extract index keys is executed is described in stages (1) to (4) of FIG. 24B. Of course by using the search method described in FIG. 21A and FIG. 21B, the search results of the prefix match search can also be extracted in descending order. And the determination of the termination of prefix match searching can also be the determination whether the index key is larger than the upper limit key.

Referencing FIG. 11 to FIG. 24, the search applications above based on the search processing to obtain the minimum value and/or the maximum value of the index keys as well as information in search path stack have been described in detail. The above search applications can be summarized roughly as bit string search methods searching for index keys in a coupled node tree wherein the search process to obtain the minimum value and/or the maximum value of the index keys in a coupled node tree is executed using a root node of the coupled node tree as the search start node, pop operations are executed on search path stack and array element numbers are read out from search path stack, and using a node which composes a node pair with the node stored in an array element whose array element number is read out by a pop operation as a search start node, the search process to obtain the minimum value and/or the maximum value of the index keys of a subtree having that search start node as a root node is executed.

Also, in the above search applications, pop operations are executed on search path stack 310 and array element numbers are read out and, from the array element number read out, regarding the node position stored in whichever of the array elements of the node pair for the node with that array element number, a determination is made as to whether the node is node [1] side or node [0] side. However, that determination is a determination as to whether the node is the primary node side or the other node side that is the pair of the primary node. As was described above in the illustrative embodiments, the primary node is stored in the array element on the smaller side for an array element number for a node pair but the primary node is not limited to this position. Since it can also be stored in the array element on the larger side for an array element number, the above cited determination of node position corresponds to a determination of whether the array element number read out from search path stack 310 is on the larger side or on the smaller side of the array element number for the array element wherein is stored the node pair which includes the node stored in the array element with that array element number.

The best illustrative embodiments of this invention have been described in detail above but the fact that the embodiments to implement this invention are not limited to the above but can be implemented by various variations on the above will be clear to those skilled in the art. Also, it is clear that the bit string search method of this invention can be implemented by a program in a computer.

As was described above, according to this invention, by using a coupled node tree, the extraction of the maximum value, the minimum value, and the index keys in ascending order or descending order from a set of any bit strings and the setting of the lower limit value and/or the upper limit value of search range can be realized with simple, high-speed methods, and furthermore, by using these methods and setting a search range, the extraction of index keys in ascending or descending order, or the extractions of index keys with a prefix match can be realized at a high speed.

What is claimed is:

1. A bit string searching apparatus for searching for index keys
based on a tree data structure that holds index keys composed of bit strings that are the object of searches by means of a search key composed of a bit string, comprising:
a coupled node tree having a root node as the starting point of the tree and node pairs which are configurational elements of the tree and which are two nodes, a primary node and a non-primary node, arranged in adjacent areas of storage,
wherein
the nodes have an area that holds the node type, which indicates whether the node is a branch node or a leaf node, and
the branch node having, in addition to the node type, an area that holds a discrimination bit position of the search key and an area holding information that indicates the position of a primary node of a node pair that is a link target but not having an area holding an index key composed of a bit string that is an object of searches,
the leaf node having, in addition to the node type, an area holding the index key composed of a bit string that is the object of searches but not having an area that holds a discrimination bit position of the search key nor an area holding information that indicates the position of a primary node of a node pair that is a link target;
a search start node read-out means obtaining the information indicating a position of a search start node which is an arbitrary node of the coupled node tree and reading out the search start node by means of the information indicating the position of the search start node;
a node type determination means reading out the node type from the area that holds the node type of the node and determining whether the node type indicates a leaf node or a branch node;
an index key read-out means reading out the index key from the area in the leaf node holding the index key;
a link means reading out the discrimination bit position and the information indicating the position of a primary node of a node pair that is a link target from the area in the branch node holding the discrimination bit position and from the area holding the information indicating the position of the primary node of a node pair that is a link target respectively, and obtaining information indicating the node position of one of the nodes of a node pair by a calculation with the bit value in the search key for the discrimination bit position read out and the information indicating the position of a primary node of a node pair that is a link target, and, from a storage area indicated by the obtained information indicating the node position, reading out the node stored in the storage area as the link target node; and wherein
the node type determination means making a determination of the node type of the search start node read out by the search start node read-out means, and
if the node type indicates a leaf node, the index key read-out means reading out the index key from the leaf node, and
if the node type indicates a branch node, repeating the processes of the link means reading out the link target node and the node type determination means determining the node type of the link target node read out, until the node type indicates a leaf node, and the index key read-out means reading out the index key from the leaf node, and
an index key stored in the leaf node is obtained as a search result key of an arbitrary subtree of the coupled node tree by means of the search key, the subtree having the search start node as its root node.

2. A bit string searching method wherein the bit string searching apparatus according to claim 1 searches for index keys based on the coupled node tree data structure, comprising:
- a search start node read-out step obtaining the information indicating a position of a search start node which is an arbitrary node of the coupled node tree and reading out the search start node by means of the information indicating the position of the search start node;
- a node type determination step reading out the node type from the area that holds the node type of the node and determining whether the node type indicates a leaf node or a branch node;
- an index key read-out step reading out the index key from the area in the leaf node holding the index key;
- a link step reading out the discrimination bit position and the information indicating the position of a primary node of a node pair that is a link target from the area in the branch node holding the discrimination bit position and from the area holding the information indicating the position of the primary node of a node pair that is a link target respectively, and obtaining information indicating the node position of one of the nodes of a node pair by a calculation with the bit value in the search key for the discrimination bit position read out and the information indicating the position of a primary node of a node pair that is a link target, and, from a storage area indicated by the obtained information indicating the node position, reading out the node stored in the storage area as the link target node; and wherein
- making, by the node type determination step, a determination of the node type of the search start node read out by the search start node read-out step, and
- if the node type indicates a leaf node, reading out, by the index key read-out step, the index key from the leaf node, and
- if the node type indicates a branch node, reading out, by the link step, the link target node and the determination of the node type, by the node type determination step, of the link target node read out is repeated, until the node type indicates a leaf node, and reading out, by the index key read-out step, the index key from the leaf node, and
- an index key stored in the leaf node is obtained as a search result key of an arbitrary subtree of the coupled node tree by means of the search key, the subtree having the search start node as its root node.

3. A bit string searching method according to claim 2, wherein the coupled node tree is stored in an array and the information that indicates the position of a primary node is an array element number of an array element of the array in which the primary node is stored,
- and the array element number of an array element in which the search start node is stored and the array element numbers of array elements in which is stored the link target node from the search start node up until the leaf node are successively held in a stack.

4. A computer-readable storage medium storing a program for execution by a computer of the bit string searching method according to claim 2.

5. A bit string searching method wherein the bit string searching apparatus according to claim 1 searches for index keys based on the coupled node tree data structure, comprising:
- a search start node read-out step obtaining the information indicating a position of a search start node which is an arbitrary node of the coupled node tree and reading out the search start node by means of the information indicating the position of the search start node;
- a node type determination step reading out the node type from the area that holds the node type of the node and determining whether the node type indicates a leaf node or a branch node;
- an index key read-out step reading out the index key from the area in the leaf node holding the index key;
- a link step reading out the information indicating the position of a primary node of a node pair that is a link target from the area in the branch node holding the information indicating the position of the primary node of a node pair that is a link target, and reading out as link target only the primary nodes stored in the area indicated by the position information indicating the primary node of the node pair of the link target that is read out, or reading out as the link target only the non-primary nodes stored in the area the position whereof obtained by a calculation based on the position information indicating the primary node of the node pair of the link target that is read out; and wherein
- making, by the node type determination step, a determination of the node type of the search start node read out by the search start node read-out step, and
- if the node type indicates a leaf node, reading out, by the index key read-out step, the index key from the leaf node, and
- if the node type indicates a branch node, reading out, by the link step, the link target node and the determination of the node type, by the node type determination step, of the link target node read out is repeated, until the node type indicates a leaf node, and reading out, by the index key read-out step, the index key from the leaf node, and
- obtaining an index key stored in the leaf node read out in the index key read out step as a search result key, which is the minimum or maximum value of the index keys, of the coupled node tree or of a subtree of the coupled node tree having the search start node as its root node by means of the search key.

6. A bit string searching method according to claim 5, wherein the coupled node tree is stored in an array and the information that indicates the position of a primary node is an array element number of an array element of the array in which the primary node is stored,
- and the array element number of an array element in which the search start node is stored and the array element numbers of array elements in which is stored the link target from the search start node up until the leaf node are successively held in a stack.

7. A bit string searching method wherein a bit string searching apparatus searches for index keys based on a tree data structure that holds index keys composed of bit strings that are the object of searches by means of a search key composed of a bit string, comprising:
- a minimum value obtaining step obtaining a minimum value of the index keys in the coupled node tree, using the root node of the coupled node tree as the search start node and the bit string searching method according to claim 6;
- a primary node search step reading out an array element number from the stack by a pop operation on the stack, determining whether the read out array element number is an array element number of an array element holding a primary node, and repeating the reading out and the determining processes until a determination is made that the array element number read out is an array element number of an array element holding a primary node;

a subtree minimum value obtaining step performing the bit string searching method according to claim 5 by using, as the search start node, the non-primary node paired with the primary node whose array element number is determined to be an array element number of an array element holding a primary node in the primary node search step so as to obtain the minimum value of the index keys in the subtree with that search start node; and extracting the index keys stored in the coupled node tree in ascending order by repeating the primary node search step and the subtree minimum value obtaining step.

8. A computer-readable storage medium storing a program for execution by a computer of the bit string searching method according to claim 7.

9. A bit string searching method wherein a bit string searching apparatus searches for index keys based on a tree data structure that holds index keys composed of bit strings that are the object of searches by means of a search key composed of a bit string, comprising:

a maximum value obtaining step obtaining a maximum value of the index keys in the coupled node tree, using the root node of the coupled node tree as the search start node and the bit string searching method according to claim 6;

a non-primary node search step reading out an array element number from the stack by a pop operation on the stack, determining whether the read out array element number is an array element number of an array element holding a non-primary node, and repeating the reading out and the determining processes until a determination is made that the array element number read out is an array element number of an array element holding a non-primary node;

a subtree maximum value obtaining step performing the bit string searching method according to claim 5 by using, as the search start node, the primary node paired with the non-primary node whose array element number is determined to be an array element number of an array element holding a non-primary node in the non-primary node search step so as to obtain the maximum value of the index keys in the subtree with that search start node; and extracting the index keys stored in the coupled node tree in descending order by repeating the non-primary node search step and the subtree maximum value obtaining step.

10. A computer-readable storage medium storing a program for execution by a computer of the bit string searching method according to claim 9.

11. A bit string searching method wherein a bit string searching apparatus searches for index keys based on a tree data structure that holds index keys composed of bit strings that are the object of searches by means of a search key composed of a bit string, comprising:

a lower limit key obtaining step obtaining a lower limit key that specifies a lower limit of the search range;

a minimum value obtaining step performing the bit string searching method according to claim 7 by using the root node of the coupled node tree as the search start node so as to obtain the minimum value of the index keys in the coupled node tree;

a search result key extracting step comparing the lower limit key obtained by the lower limit obtaining step with the minimum value of the index keys obtained by the minimum value obtaining step, and if the lower limit key is larger, performing a bit string searching method including steps of a search start node read-out step obtaining the information indicating the position of the search start node which is one node of a node pair and reading out the search start node by means of the information indicating the position of the search start node, a node type determination step reading out the node type from the area that holds the node type of the node and determining whether the node type indicates a leaf node or a branch node, an index key read-out step reading out the index key from the area in the leaf node holding the index key, a link step reading out the discrimination bit position and the information indicating the position of a primary node of a node pair that is a link target from the area in the branch node holding the discrimination bit position and from the area holding the information indicating the position of the primary node of a node pair that is a link target respectively, and obtaining information indicating the node position of one of the nodes of a node pair by a calculation with the bit value in the search key for the discrimination bit position read out and the information indicating the position of a primary node of a node pair that is a link target, and, from a storage area indicated by the obtained information indicating the node position, reading out the node stored in the storage area as the link target node, and wherein making, by the node type determination step, a determination of the node type of the search start node read out by the search start node read-out step, and if the node type indicates a leaf node, reading out, by the index key read-out step, the index key from the leaf node, and if the node type indicates a branch node, reading out, by the link step, the link target node and the determination of the node type, by the node type determination step, of the link target node read out is repeated, until the node type indicates a leaf node, and reading out, by the index key read-out step, the index key from the leaf node, and an index key stored in the leaf node is obtained as a search result key of an arbitrary subtree of the coupled node tree by means of the search key, the subtree having the search start node as its root node, by using the lower limit key as the search key and the root node of the coupled node tree as the search start node so as to extract the search result key;

a search result key comparison step comparing the search key with the search result key extracted in the search result key extracting step and making a size relationship determination therebetween;

a primary node search step reading out an array element number from the stack by a pop operation on the stack, determining whether the read out array element number is an array element number of an array element holding a primary node, and repeating the reading out and the determining processes until a determination is made that the array element number read out is an array element number of an array element holding a primary node;

a subtree minimum value obtaining step performing the bit string searching method according to claim 5 by using, as the search start node, the non-primary node paired with the primary node whose array element number is determined to be an array element number of an array element holding a primary node in the primary node search step so as to obtain the minimum value of the index keys in the subtree with that search start node; and repeating the processing from the search result key comparison step to the subtree minimum value obtaining step, using the minimum value obtained in the subtree minimum value obtaining step as the search result key, until a determination is made that the search result key is larger than the search key so as to obtain the search result key that is larger than the search key as a lower limit value of the coupled node tree corresponding to the specified lower limit key.

12. A computer-readable storage medium storing a program for execution by a computer of the bit string searching method according to claim 11.

13. A bit string searching method wherein a bit string searching apparatus searches for index keys based on a tree data structure that holds index keys composed of bit strings that are the object of searches by means of a search key composed of a bit string, comprising:

an upper limit key obtaining step obtaining an upper limit key that specifies an upper limit of a search range;

a maximum value obtaining step performing the bit string searching method according to claim 6 by using the root node of the coupled node tree as the search start node so as to obtain the maximum value of the index keys in the coupled node tree;

a search result key extracting step comparing the upper limit key obtained by the upper limit obtaining step with the maximum value of the index keys obtained by the maximum value obtaining step, and if the upper limit key is smaller, performing a bit string searching method including steps of a search start node read-out step obtaining the information indicating the position of the search start node which is one node of a node pair and reading out the search start node by means of the information indicating the position of the search start node, a node type determination step reading out the node type from the area that holds the node type of the node and determining whether the node type indicates a leaf node or a branch node, an index key read-out step reading out the index key from the area in the leaf node holding the index key, a link step reading out the discrimination bit position and the information indicating the position of a primary node of a node pair that is a link target from the area in the branch node holding the discrimination bit position and from the area holding the information indicating the position of the primary node of a node pair that is a link target respectively, and obtaining information indicating the node position of one of the nodes of a node pair by a calculation with the bit value in the search key for the discrimination bit position read out and the information indicating the position of a primary node of a node pair that is a link target, and, from a storage area indicated by the obtained information indicating the node position, reading out the node stored in the storage area as the link target node, and wherein making, by the node type determination step, a determination of the node type of the search start node read out by the search start node read-out step, and if the node type indicates a leaf node, reading out, by the index key read-out step, the index key from the leaf node, and if the node type indicates a branch node, reading out, by the link step, the link target node and the determination of the node type, by the node type determination step, of the link target node read out is repeated, until the node type indicates a leaf node, and reading out, by the index key read-out step, the index key from the leaf node, and an index key stored in the leaf node is obtained as a search result key of an arbitrary subtree of the coupled node tree by means of the search key, the subtree having the search start node as its root node, by using the upper limit key as the search key and the root node of the coupled node tree as the search start node so as to extract the search result key;

a search result key comparison step comparing the search key with the search result key extracted in the search result key extracting step and making a size relationship determination therebetween;

a non-primary node search step reading out an array element number from the stack by a pop operation on the stack, determining whether the read out array element number is an array element number of an array element holding a non-primary node, and repeating the reading out and the determining processes until a determination is made that the array element number read out is an array element number of an array element holding a non-primary node;

a subtree maximum value obtaining step performing the bit string searching method according to claim 5 by using, as the search start node, the primary node paired with the non-primary node whose array element number is determined to be an array element number of an array element holding a non-primary node in the non-primary node search step so as to obtain the maximum value of the index keys in the subtree with that search start node; and repeating the processing from the search result key comparison step to the subtree maximum value obtaining step, using the maximum value obtained in the subtree maximum value obtaining step as the search result key, until a determination is made that the search result key is smaller than the search key so as to obtain the search result key that is smaller than the search key as an upper limit value of the coupled node tree corresponding to the specified upper limit key.

14. A computer-readable storage medium storing a program for execution by a computer of the bit string searching method according to claim 13.

15. A bit string searching method wherein a bit string searching apparatus searches for index keys based on a tree data structure that holds index keys composed of bit strings that are the object of searches by means of a search key composed of a bit string, comprising:

a first search range obtaining step obtaining an upper limit key specifying an upper limit of a search range and a lower limit key specifying a lower limit of the search range;

a second search range obtaining step obtaining an upper limit value of the coupled node tree by performing a bit string searching method including steps of an upper limit key obtaining step obtaining an upper limit key that specifies an upper limit of a search range, a maximum value obtaining step performing the bit string searching method according to claim 6 by using the root node of the coupled node tree as the search start node so as to obtain the maximum value of the index keys in the coupled node tree, a search result key extracting step comparing the upper limit key obtained by the upper limit obtaining step with the maximum value of the index keys obtained by the maximum value obtaining step, and if the upper limit key is smaller, performing a bit string searching method including steps of a search start node read-out step obtaining the information indicating the position of the search start node which is one node of a node pair and reading out the search start node by means of the information indicating the position of the search start node, a node type determination step reading out the node type from the area that holds the node type of the node and determining whether the node type indicates a leaf node or a branch node, an index key read-out step reading out the index key from the area in the leaf node holding the index key, a link step reading out the discrimination bit position and the information indicating the position of a primary node of a node pair that is a link target from the area in the branch node holding the discrimination bit position and from the area holding the information indicating the position of the primary node of a node pair that is a link target respectively, and obtaining information indicating the node position of one of the nodes of a node pair by a calculation with the bit value in the search key for the discrimination bit position read out and the information indicating the position of a primary node of a node pair that is a link target, and, from a storage area indicated by the obtained information indicating the node position, reading out the node stored in the storage area as the link target node, and wherein making, by the node type determination step, a determination of the node type of the search start node read out by the search start node read-out step, and if the node type indicates a leaf node, reading out, by the index key read-out step, the index key from the leaf node, and if the node type indicates a branch node, reading out, by the link step, the link target node and the determination of the node type, by the node type determination step, of the link target node read out is repeated, until the node type indicates a leaf node, and reading out, by the index key read-out step, the index key from the leaf node, and an index key stored in the leaf node is obtained as a search result key of an arbitrary subtree of the coupled node tree by means of the search key, the subtree having the search start node as its root node, by using the upper limit key as the search key and the root node of the coupled node tree as the search start node so as to extract the search result key, a search result key comparison step comparing the search key with the search result key extracted in the search result key extracting step and making a size relationship determination therebetween, a non-primary node search step reading out an array element number from the stack by a pop operation on the stack, determining whether the read out array element number is an array element number of an array element holding a non-primary node, and repeating the reading out and the determining processes until a determination is made that the array element number read out is an array element number of an array element holding a non-primary node, a subtree maximum value obtaining step performing the bit string searching method according to claim 5 by using, as the search start node, the primary node paired with the non-primary node whose array element number is determined to be an array element number of an array element holding a non-primary node in the non-primary node search step so as to obtain the maximum value of the index keys in the subtree with that search start node, and repeating the processing from the search result key comparison step to the subtree maximum value obtaining step, using the maximum value obtained in the subtree maximum value obtaining step as the search result key, until a determination is made that the search result key is smaller than the search key so as to obtain the search result key that is smaller than the search key as an upper limit value of the coupled node tree corresponding to the specified upper limit key, based on the upper limit key obtained in the first search range obtaining step as well as obtaining a lower limit value of the coupled node tree by performing a bit string searching method including steps of a lower limit key obtaining step obtaining a lower limit key that specifies a lower limit of the search range, a minimum value obtaining step performing the bit string searching method according to claim 6 by using the root node of the coupled node tree as the search start node so as to obtain the minimum value of the index keys in the coupled node tree, a search result key extracting step comparing the lower limit key obtained by the lower limit obtaining step with the minimum value of the index keys obtained by the minimum value obtaining step, and if the lower limit key is larger, performing a bit string searching method including steps of a search start node read-out step obtaining the information indicating the position of the search start node which is one node of a node pair and reading out the search start node by means of the information indicating the position of the search start node, a node type determination step reading out the node type from the area that holds the node type of the node and determining whether the node type indicates a leaf node or a branch node, an index key read-out step reading out the index key from the area in the leaf node holding the index key, a link step reading out the discrimination bit position and the information indicating the position of a primary node of a node pair that is a link target from the area in the branch node holding the discrimination bit position and from the area holding the information indicating the position of the primary node of a node pair that is a link target respectively, and obtaining information indicating the node position of one of the nodes of a node pair by a calculation with the bit value in the search key for the discrimination bit position read out and the information indicating the position of a primary node of a node pair that is a link target, and, from a storage area indicated by the obtained information indicating the node position, reading out the node stored in the storage area as the link target node, and wherein making, by the node type determination step, a determination of the node type of the search start node read out by the search start node read-out step, and if the node type indicates a leaf node, reading out, by the index key read-out step, the index key from the leaf node, and if the node type indicates a branch node, reading out, by the link step, the link target node and the determination of the node type, by the node type determination step, of the link target node read out is repeated, until the node type indicates a leaf node, and reading out, by the index key read-out step, the index key from the leaf node, and an index key stored in the leaf node is obtained as a search result key of an arbitrary subtree of the coupled node tree by means of the search key, the subtree having the search start node as its root node, by using the lower limit key as the search key and the root node of the coupled node tree as the search start node so as to extract the search result key, a search result key comparison step comparing the search key with the search result key extracted in the search result key extracting step and making a size relationship determination therebetween, a primary node search step reading out an array element number from the stack by a pop operation on the stack, determining whether the read out array element number is an array element number of an array element holding a primary node, and repeating the reading out and the determining processes until a determination is made that the array element number read out is an array element number of an array element holding a primary node, a subtree minimum value obtaining step performing the bit string searching method according to claim 6 by using, as the search start node, the non-primary node paired with the primary node whose array element number is determined to be an array element number of an array element holding a primary node in the primary node search step so as to obtain the minimum value of the index keys in the subtree with that search start node, and repeating the processing from the search result key comparison step to the subtree minimum value obtaining step, using the minimum value obtained in the subtree minimum value obtaining step as the search result key, until a determination is made that the search result key is larger than the search key so as to obtain the search result key that is larger than the search key as a lower limit value of the coupled node tree corresponding to the specified lower limit key, based on the lower limit key obtained in the first search range obtaining step;

a search result key extracting step performing a bit string searching method including steps of a search start node read-out step obtaining the information indicating the position of the search start node which is one node of a node pair and reading out the search start node by means of the information indicating the position of the search start node, a node type determination step reading out the node type from the area that holds the node type of the node and determining whether the node type indicates a leaf node or a branch node, an index key read-out step reading out the index key from the area in the leaf node holding the index key, a link step reading out the discrimination bit position and the information indicating the position of a primary node of a node pair that is a link target from the area in the branch node holding the discrimination bit position and from the area holding the information indicating the position of the primary node of a node pair that is a link target respectively, and obtaining information indicating the node position of one of the nodes of a node pair by a calculation with the bit value in the search key for the discrimination bit position read out and the information indicating the position of a primary node of a node pair that is a link target, and, from a storage area indicated by the obtained information indicating the node position, reading out the node stored in the storage area as the link target node, and wherein making, by the node type determination step, a determination of the node type of the search start node read out by the search start node read-out step, and if the node type indicates a leaf node, reading out, by the index key read-out step, the index key from the leaf node, and if the node type indicates a branch node, reading out, by the link step, the link target node and the determination of the node type, by the node type determination step, of the link target node read out is repeated, until the node type indicates a leaf node, and reading out, by the index key read-out step, the index key from the leaf node, and an index key stored in the leaf node is obtained as a search result key of an arbitrary subtree of the coupled node tree by means of the search key, the subtree having the search start node as its root node, by using the lower limit value obtained in the second search range obtaining step as the search key and the root node of the coupled node tree as the search start node so as to extract an index key that corresponds to the lower limit key as the search result key;

a search result key comparison step comparing the search key with the search result key extracted in the search result key extracting step and making a size relationship determination therebetween;

a primary node search step reading out an array element number from the stack by a pop operation on the stack, determining whether the read out array element number is an array element number of an array element holding a primary node, and repeating the reading out and the determining processes until a determination is made that the array element number read out is an array element number of an array element holding a primary node;

a subtree minimum value obtaining step performing the bit string searching method according to claim 6 by using, as the search start node, the non-primary node paired with the primary node whose array element number is determined to be an array element number of an array element holding a primary node in the primary node search step so as to obtain the minimum value of the index keys in the subtree with that search start node; and extracting the index keys stored in the coupled node tree and whose value is between the specified lower limit key and upper limit key in ascending order by repeating the processing from the search result key comparison step to the subtree minimum value obtaining step, using the minimum value obtained in the subtree minimum value obtaining step as the search result key until a determination is made that the search result key is coincident with the upper limit value.

16. A bit string searching method wherein a bit string searching apparatus searches for index keys based on a tree data structure that holds index keys composed of bit strings that are the object of searches by means of a search key composed of a bit string, comprising:

obtaining a lower limit key by replacing bits of a specified prefix match key to be ignored with "0";

obtaining a upper limit key by replacing bits of the specified prefix match key to be ignored with "1"; and performing the bit string searching methods according to claim 15 based on the upper limit key and the lower limit key so as to extract index keys of the coupled node tree as search result keys by means of the specified prefix match key.

17. A computer-readable storage medium storing a program for execution by a computer of the bit string searching method according to claim 16.

18. A computer-readable storage medium storing a program for execution by a computer of the bit string searching method according to claim 15.

19. A bit string searching method wherein a bit string searching apparatus searches for index keys based on a tree data structure that holds index keys composed of bit strings that are the object of searches by means of a search key composed of a bit string, comprising:

a first search range obtaining step obtaining an upper limit key specifying the upper limit of the search range and a lower limit key specifying the lower limit of the search range;

a second search range obtaining step obtaining the upper limit value of the coupled node tree by performing a bit string searching method including steps of an upper limit key obtaining step obtaining an upper limit key that specifies an upper limit of a search range, a maximum value obtaining step performing the bit string search method according to claim 6 by using the root node of the coupled node tree as the search start node so as to obtain the maximum value of the index keys in the coupled node tree, a search result key extracting step comparing the upper limit key obtained by the upper limit obtaining step with the maximum value of the index keys obtained by the maximum value obtaining step, and if the upper limit key is smaller, performing a bit string searching method including steps of a search start node read-out step obtaining the information indicating the position of the search start node which is one node of a node pair and reading out the search start node by means of the information indicating the position of the search start node, a node type determination step reading out the node type from the area that holds the node type of the node and determining whether the node type indicates a leaf node or a branch node, an index key read-out step reading out the index key from the area in the leaf node holding the index key, a link step reading out the discrimination bit position and the information indicating the position of a primary node of a node pair that is a link target from the area in the branch node holding the discrimination bit position and from the area holding the information indicating the position of the primary node of a node pair that is a link target respectively, and obtaining information indicating the node position of one of the nodes of a node pair by a calculation with the bit value in the search key for the discrimination bit position read out and the information indicating the position of a primary node of a node pair that is a link target, and, from a storage area indicated by the obtained information indicating the node position, reading out the node stored in the storage area as the link target node, and wherein making, by the node type determination step, a determination of the node type of the search start node read out by the search start node read-out step, and if the node type indicates a leaf node, reading out, by the index key read-out step, the index key from the leaf node, and if the node type indicates a branch node, reading out, by the link step, the link target node and the determination of the node type, by the node type determination step, of the link target node read out is repeated, until the node type indicates a leaf node, and reading out, by the index key read-out step, the index key from the leaf node, and an index key stored in the leaf node is obtained as a search result key of an arbitrary subtree of the coupled node tree by means of the search key, the subtree having the search start node as its root node, by using the upper limit key as the search key and the root node of the coupled node tree as the search start node so as to extract the search result key, a search result key comparison step comparing the search key with the search result key extracted in the search result key extracting step and making a size relationship determination therebetween, a non-primary node search step reading out an array element number from the stack by a pop operation on the stack, determining whether the read out array element number is an array element number of an array element holding a non-primary node, and repeating the reading out and the determining processes until a determination is made that the array element number read out is an array element number of an array element holding a non-primary node, a subtree maximum value obtaining step performing the bit string searching method according to claim 6 by using, as the search start node, the primary node paired with the non-primary node whose array element number is determined to be an array element number of an array element holding a non-primary node in the non-primary node search step so as to obtain the maximum value of the index keys in the subtree with that search start node, and repeating the processing from the search result key comparison step to the subtree maximum value obtaining step, using the maximum value obtained in the subtree maximum value obtaining step as the search result key, until a determination is made that the search result key is smaller than the search key so as to obtain the search result key that is smaller than the search key as an upper limit value of the coupled node tree corresponding to the specified upper limit key, based on the upper limit key obtained in the first search range obtaining step as well as obtaining the lower limit value of the coupled node tree by performing a bit string searching method including steps of a lower limit key obtaining step obtaining a lower limit key that specifies a lower limit of the search range, a minimum value obtaining step performing the bit string searching method according to claim 6 by using the root node of the coupled node tree as the search start node so as to obtain the minimum value of the index keys in the coupled node tree, a search result key extracting step comparing the lower limit key obtained by the lower limit obtaining step with the minimum value of the index keys obtained by the minimum value obtaining step, and if the lower limit key is larger, performing a bit string searching method including steps of a search start node read-out step obtaining the information indicating the position of the search start node which is one node of a node pair and reading out the search start node by means of the information indicating the position of the search start node, a node type determination step reading out the node type from the area that holds the node type of the node and determining whether the node type indicates a leaf node or a branch node, an index key read-out step reading out the index key from the area in the leaf node holding the index key, a link step reading out the discrimination bit position and the information indicating the position of a primary node of a node pair that is a link target from the area in the branch node holding the discrimination bit position and from the area holding the information indicating the position of the primary node of a node pair that is a link target respectively, and obtaining information indicating the node position of one of the nodes of a node pair by a calculation with the bit value in the search key for the discrimination bit position read out and the information indicating the position of a primary node of a node pair that is a link target, and, from a storage area indicated by the obtained information indicating the node position, reading out the node stored in the storage area as the link target node, and wherein making, by the node type determination step, a determination of the node type of the search start node read out by the search start node read-out step, and if the node type indicates a leaf node, reading out, by the index key read-out step, the index key from the leaf node, and if the node type indicates a branch node, reading out, by the link step, the link target node and the determination of the node type, by the node type determination step, of the link target node read out is repeated, until the node type indicates a leaf node, and reading out, by the index key read-out step, the index key from the leaf node, and an index key stored in the leaf node is obtained as a search result key of an arbitrary subtree of the coupled node tree by means of the search key, the subtree having the search start node as its root node, by using the lower limit key as the search key and the root node of the coupled node tree as the search start node so as to extract the search result key, a search result key comparison step comparing the search key with the search result key extracted in the search result key extracting step and making a size relationship determination therebetween, a primary node search step reading out an array element number from the stack by a pop operation on the stack, determining whether the read out array element number is an array element number of an array element holding a primary node, and repeating the reading out and the determining processes until a determination is made that the array element number read out is an array element number of an array element holding a primary node, a subtree minimum value obtaining step performing the bit string searching method according to claim 6 by using, as the search start node, the non-primary node paired with the primary node whose array element number is determined to be an array element number of an array element holding a primary node in the primary node search step so as to obtain the minimum value of the index keys in the subtree with that search start node, and repeating the processing from the search result key comparison step to the subtree minimum value obtaining step, using the minimum value obtained in the subtree minimum value obtaining step as the search result key, until a determination is made that the search result key is larger than the search key so as to obtain the search result key that is larger than the search key as a lower limit value of the coupled node tree corresponding to the specified lower limit key, based on the lower limit key obtained in the first search range obtaining step;

a search result key extracting step performing a bit string searching method including steps of a search start node read-out step obtaining the information indicating the position of the search start node which is one node of a node pair and reading out the search start node by means of the information indicating the position of the search start node, a node type determination step reading out the node type from the area that holds the node type of the node and determining whether the node type indicates a leaf node or a branch node, an index key read-out step reading out the index key from the area in the leaf node holding the index key, a link step reading out the discrimination bit position and the information indicating the position of a primary node of a node pair that is a link target from the area in the branch node holding the discrimination bit position and from the area holding the information indicating the position of the primary node of a node pair that is a link target respectively, and obtaining information indicating the node position of one of the nodes of a node pair by a calculation with the bit value in the search key for the discrimination bit position read out and the information indicating the position of a primary node of a node pair that is a link target, and, from a storage area indicated by the obtained information indicating the node position, reading out the node stored in the storage area as the link target node, and wherein making, by the node type determination step, a determination of the node type of the search start node read out by the search start node read-out step, and if the node type indicates a leaf node, reading out, by the index key read-out step, the index key from the leaf node, and if the node type indicates a branch node, reading out, by the link step, the link target node and the determination of the node type, by the node type determination step, of the link target node read out is repeated, until the node type indicates a leaf node, and reading out, by the index key read-out step, the index key from the leaf node, and an index key stored in the leaf node is obtained as a search result key of an arbitrary subtree of the coupled node tree by means of the search key, the subtree having the search start node as its root node, by using the upper limit value obtained in the second search range obtaining step as the search key and the root node of the coupled node tree as the search start node so as to extract an index key that corresponds to the upper limit key as the search result key;

a search result key comparison step comparing the search key with the search result key extracted in the search result key extracting step and making a size relationship determination therebetween;

a non-primary node search step reading out an array element number from the stack by a pop operation on the stack, determining whether the read out array element number is an array element number of an array element holding a non-primary node, and repeating the reading out and the determining processes until a determination is made that the array element number read out is an array element number of an array element holding a non-primary node;

a subtree maximum value obtaining step performing the bit string searching method according to claim 6 by using, as the search start node, the primary node paired with the non-primary node whose array element number is determined to be an array element number of an array element holding a non-primary node in the non-primary node search step so as to obtain the maximum value of the index keys in the subtree with that search start node; and extracting the index keys stored in the coupled node tree and whose value is between the specified lower limit key and upper limit key in descending order by repeating the processing from the search result key comparison step to the subtree maximum value obtaining step, using the maximum value obtained in the subtree maximum value obtaining step as the search result key until a determination is made that the search result key is coincident with the lower limit value.

20. A bit string searching method wherein a bit string searching apparatus searches for index keys based on a tree data structure that holds index keys composed of bit strings that are the object of searches by means of a search key composed of a bit string, comprising:

obtaining a lower limit key by replacing bits of a specified prefix match key to be ignored with "0";

obtaining a upper limit key by replacing bits of the specified prefix match key to be ignored with "1"; and performing the bit string searching methods according to claim 19 based on the upper limit key and the lower limit key so as to extract index keys of the coupled node tree as search result keys by means of the specified prefix match key.

21. A computer-readable storage medium storing a program for execution by a computer of the bit string searching method according to claim 20.

22. A computer-readable storage medium storing a program for execution by a computer of the bit string searching method according to claim 19.

23. A computer-readable storage medium storing a program for execution by a computer of the bit string searching method according to claim 5.

* * * * *